United States Patent [19]

Yamada et al.

[11] Patent Number: 5,692,097
[45] Date of Patent: Nov. 25, 1997

[54] VOICE RECOGNITION METHOD FOR RECOGNIZING A WORD IN SPEECH

[75] Inventors: Maki Yamada, Kawasaki; Masakatsu Hoshimi, Zama; Taisuke Watanabe; Katsuyuki Niyada, both of Sagamihara, all of Japan

[73] Assignee: Matsushita Electric Industrial Co., Ltd., Osaka, Japan

[21] Appl. No.: 347,089

[22] Filed: Nov. 23, 1994

[30] Foreign Application Priority Data

Nov. 25, 1993 [JP] Japan .................................. 5-295137

[51] Int. Cl.⁶ ....................................................... G10L 9/14
[52] U.S. Cl. .......................... 395/2.5; 395/2.4; 395/2.45; 395/2.49; 395/2.55; 395/2.58
[58] Field of Search .................................... 395/2.45–2.49, 395/2.5, 2.51, 2.52, 2.58, 2.42, 2.17, 2.55, 2.56, 2.57; 381/43

[56] References Cited

U.S. PATENT DOCUMENTS

| 4,467,437 | 8/1984 | Tsuruta et al. | 381/43 |
|---|---|---|---|
| 4,716,593 | 12/1987 | Hirai et al. | 381/43 |
| 4,720,802 | 1/1988 | Damoulakis et al. | 381/43 |
| 4,783,802 | 11/1988 | Takebayashi et al. | 381/43 |
| 4,817,159 | 3/1989 | Hoshimi et al. | 381/43 |
| 4,882,755 | 11/1989 | Yamada et al. | 381/43 |
| 4,888,823 | 12/1989 | Nitta et al. | 381/43 |
| 4,905,287 | 2/1990 | Segawa et al. | 381/43 |
| 5,023,912 | 6/1991 | Segawa et al. | 381/43 |
| 5,274,737 | 12/1993 | Shinoda et al. | 395/2 |
| 5,309,547 | 5/1994 | Niyada et al. | 395/2.47 |
| 5,315,689 | 5/1994 | Kanazawa et al. | 395/2.47 |
| 5,369,728 | 11/1994 | Kosaka et al. | 395/2.63 |

FOREIGN PATENT DOCUMENTS 5-88692    4/1993   Japan .

*Primary Examiner*—Allen R. MacDonald
*Assistant Examiner*—Michael N. Opsasnick
*Attorney, Agent, or Firm*—Lowe, Price, LeBlanc & Becker

[57] ABSTRACT

An inter-frame similarity between an input voice and a standard patterned word is calculated for each of frames and for each of standard patterned words, and a posterior probability similarity is produced by subtracting a constant value from each of the inter-frame similarities. The constant value is determined by analyzing voice data obtained from specified persons to set the posterior probability similarities to positive values when a word existing in the input voice matches with the standard patterned word and to set the posterior probability similarities to negative values when a word existing in the input voice does not match with the standard patterned word. Thereafter, an accumulated similarity having an accumulated value obtained by accumulating values of the posterior probability similarities according to a continuous dynamic programming matching operation for the frames of the input voice is calculated for each of the standard patterned words. Thereafter, a particular standard patterned word relating to an accumulated similarity having a maximum value among the accumulated similarities is output as a recognized word of the input voice.

28 Claims, 11 Drawing Sheets

VOICE RECOGNITION METHOD FOR RECOGNIZING A WORD IN SPEECH

BACKGROUND OF THE INVENTION

1. Field of the Invention

The present invention relates to a voice recognition method for recognizing a voice with a voice recognition apparatus.

2. Description of the Prior Art

2.1. Previously Proposed Art

One of voice recognition methods in which a voice of an unspecified person is recognized has been disclosed in a Published Unexamined Japanese Patent Application No. 88692 of 1993 (H5-88692). In this application, a plurality of standard patterns of voice pieces are initially produced according to pieces of voice data obtained by analyzing referential voices of a small number of specified persons, and a word vocalized by an unspecified person is recognized by connecting standard patterns of voice pieces relating to the word.

FIG. 1 is a block diagram of a voice recognition apparatus in which a word vocalized by an unspecified person is recognized according to the voice recognition method disclosed in the Application No. 88692 of 1993.

As shown in FIG. 1, a voice recognition apparatus 11 is provided with a sound analyzing unit 12 for analyzing the sound of an input voice of a vocalized word for each of frames (in other words, at regular intervals), a feature parameter extracting unit 13 for extracting feature parameters of the input voice of which the sound is analyzed in the sound analyzing unit 12 for each of frames, a standard patterned phoneme storing unit 14 for storing a plurality of standard patterned phonemes obtained by analyzing referential voices of a large number of specified persons, a phoneme similarity calculating unit 15 for calculating a phoneme similarity between each of the standard patterned phonemes stored in the storing unit 14 and each of feature parameters extracted in the extracting unit 13 for each of frames and for each of the standard patterned phonemes and producing a similarity vector composed of a plurality of phoneme similarities at a frame for each of frames, a normalized similarity vector calculating unit 16 for normalizing the similarity vectors produced in the calculating unit 15 to produce a normalized similarity vector having normalized phoneme similarities for each of frames, a regression coefficient calculating unit 17 for calculating a regression coefficient denoting a time variation of a normalized phoneme similarity in a normalized similarity vector obtained in the calculating unit 16 for each of frames and for each of the standard patterned phonemes and producing a regression coefficient vector composed of the regression coefficients for the standard patterned phonemes for each of frames, a normalized regression coefficient vector calculating unit 18 for normalizing the regression coefficient vector produced in the calculating unit 17 to produce a normalized regression coefficient vector for each of frames, and an input voice parameter series producing unit 19 for rearranging a time series of normalized similarity vectors calculated in the calculating unit 16 and a time series of normalized regression coefficient vectors calculated in the calculating unit 18 as a time series of input voice parameters.

In the above configuration, when an input voice denoting a vocalized word of an unspecified person is received in the voice recognition apparatus 11, the sound of the input voice is analyzed according to a linear predictive coding (LPC) in the sound analyzing unit 12 each time an analyzing time (10 msec) passes. The analyzing time is called a frame. Therefore, the linear predictive coding is performed for each of frames. Thereafter, feature parameters such as LPC cepstrum coefficients C0 to C8 and a differential value V0 of a voice power in a time direction are extracted in the feature parameter extracting unit 13 for each of frames according to the analysis performed in the sound analyzing unit 12, and a series of feature parameters is determined for each of frames.

In the standard patterned phoneme storing unit 14, twenty types standard patterned phonemes /a/,/o/,/u/,/i/,/e/,/j/, /w/,/m/,/n/,/ ᴐ /,/b/,/d/,/r/,/z/,/h/,/s/;/c/,/p/,/t/ and /k/ produced from pieces of voice data which are obtained by analyzing referential voices of a large number of specified persons are stored in advance. The standard patterned phonemes are produced as follows.

A feature frame denoting a time-position in which features of a phoneme are expressed in a good condition is detected with high accuracy by eyes of an operator for each of phonemes. Thereafter, a standard patterned phoneme is produced for each of phonemes by utilizing a time pattern of feature parameters at several frames centering around the feature frame. In detail, a one-dimensional time series of feature parameters x composed of LPC cepstrum coefficients C0 to C8 and differential voice powers V0 of the feature frame, eight frames just before the feature frame and three frames just after the feature frame is utilized to obtain a time pattern of the feature parameters x. A differential voice power V0 is obtained by differentiating a voice power with respect to time. The time series of feature parameters x is expressed according to an equation (1).

$$x=(C0^{(1)},C1^{(1)},..C8^{(1)},V0^{(1)},C0^{(2)},C1^{(2)},..C8^{(2)},V0^{(2)},\ldots,C0^{(12)},C1^{(12)},..C8^{(12)},V0^{(12)}) \quad (1)$$

Here $Ci^{(k)}$ denotes an i-th LPC cepstrum coefficient in a k-th frame and $Vi^{(k)}$ denotes an i-th differential voice power in the k-th frame. The reason that any voice power is not utilized but differential voice powers V0 in time direction are utilized is to avoid an adverse influence of a voice having a large voice power. The time series of feature parameters x for a phoneme P is extracted for each of feature frames determined by the voice data relating to a large number of specified persons, and an average value vector $\mu_p$ having average elements which each are obtained by averaging elements placed at prescribed positions of a plurality of time series of feature parameters x and a covariance matrix $\Sigma_p$ having covariance elements which each are determined as a covariance of elements placed at prescribed positions of a plurality of time series of feature parameters x are calculated for the phoneme P. Thereafter, a standard patterned phoneme for the phoneme P is defined as a set $(2*\Sigma_p^{-1}, *\mu_p, \mu_p^{t*}\Sigma_p^{-1}*\mu_p)$ by utilizing the average value vector $\mu_p$ and the covariance matrix $\Sigma_p$. Therefore, the standard patterned phoneme defined for each of phonemes is made from the feature parameters (that is, the LPC cepstrum coefficients C0 to C8 and the differential voice powers V0) of a plurality of frames. In other words, the standard patterned phoneme defined for each of phonemes is made by considering time-movements of the feature parameters.

Thereafter, a phoneme similarity $d_p$ between each of the standard patterned phonemes stored in the storing unit 14 and the time series of feature parameters x (that is, the LPC cepstrum coefficients C0 to C8 and the differential voice powers V0) obtained in the extracting unit 13 is calculated for each of frames in the phoneme similarity calculating unit 15. The phoneme similarity $d_P$ for the phoneme P is expressed by a Maharanobis' distance according to an equation (2).

$$d_P = (x-\mu_P)' \Sigma_P^{-1}(x-\mu_P) \qquad (2)$$

Here the symbol x denotes a time series of feature parameters of the input voice extracted in the extracting unit 15.

In cases where covariance matrices for all of phonemes are the same, each of the covariance matrices are expressed by $\Sigma$. Therefore, the equation (2) can be rewritten to an equation (3).

$$d_P = b_P - a_P * x \qquad (3)$$

where, $a_P = 2*\Sigma^{-1}*\mu_P$ and $b_P = \mu_P{}'*\Sigma^{-1}*\mu_P$ are satisfied.

To simplify the description of the prior art, the phoneme similarity $d_P$ defined by the equation (3) is utilized. The set $(a_P, b_P)$ denotes a standard patterned phoneme for the phoneme P and are stored in the storing unit 14 in advance.

When an input voice "AKAI" is received in the apparatus 11 because the unspecified person vocalizes a Japanese word denoting an English word "red", the phoneme similarity defined by the equation (3) is calculated for each of the twenty phonemes and for each of frames in the calculating unit 15, and a time series of similarity vectors is obtained as shown in FIG. 2. Each of the similarity vectors is defined as a vector having twenty phoneme similarity as elements in a particular frame. That is, each of the similarity vectors is defined as a twenty-dimensional vector. For example, one of the similarity vectors is shown in a region designated by slant lines in FIG. 2. As shown in FIG. 2, four frames passes during a period required for a first voice piece /A/ of the input voice "AKAI", four frames passes during a period required for a second voice piece /K/ of the input voice "AKAI", five frames passes during a period required for a third voice piece /A/ of the input voice "AKAI", and five frames passes during a period required for a fourth voice piece /I/ of the input voice "AKAI". Therefore, the similarity vector is obtained for each of frames. Also, a time series of phoneme similarities, for example, obtained by matching the input voice to the standard patterned phoneme /a/ while shifting the frames one by one is expressed by 40,46,68,60, 42,1,4,6,20,40,65,81,64,49,15,10,14 and 16. The time series of phoneme similarities is obtained for each of the twenty standard patterned phonemes.

Thereafter, twenty elements of each of the similarity vectors are respectively divided by a vector length of a corresponding similarity vector in the normalized similarity vector calculating unit 18 to normalize the vector length of each of the similarity vectors to a unity. Therefore, a normalized similarity vector having twenty normalized phoneme similarities as normalized elements is formed for each of frames, and a time series of normalized similarity vectors is formed.

Thereafter, in the regression coefficient calculating unit 17, a regression coefficient denoting a time variation of normalized phone similarities in a time series of normalized phone similarities obtained in the calculating unit 16 is calculated for each of frames and for each of the twenty standard patterned phonemes. In detail, a normalized phoneme similarity obtained by matching the input voice to a particular standard patterned phoneme is plotted for each of frames while shifting the frames one by one, and an inclination of a straight line defined by connecting a particular normalized phoneme similarity at a particular frame, two normalized phoneme similarities at two frames after the particular frame and two normalized phoneme similarities at two frames before the particular frame according to a least square approximation is calculated as a regression coefficient for the particular frame and the particular standard patterned phoneme.

As shown in FIG. 8, a regression coefficient for an i-th frame and the standard patterned phoneme /a/ is obtained by calculating an inclination of a straight regression line which connects five normalized phone similarities matching with the standard patterned phoneme /a/ at an (i−2)-th frame, an (i−1)th frame, the i-th frame, an (i+1)-th frame and an (i+2)-th frame according to the least square approximation. The regression coefficient K is obtained according to an equation (4).

$$K = \frac{5 * \sum_{t=1}^{5}(t*x_t) - \sum_{t=1}^{5} t * \sum_{t=1}^{5} x_t}{5 * \sum_{t=1}^{5} t^2 - \left\{\sum_{t=1}^{5} t\right\}^2} \qquad (4)$$

Here the symbol $x_t$ (t=1,2,--,5) denotes a normalized phoneme similarity of a time series of phoneme similarities for the standard patterned phoneme /a/, and the symbol K denotes a regression coefficient at a fixed time t+2 for the standard patterned phoneme /a/. The regression coefficient K is calculated for each of the twenty standard patterned phonemes and for each of frames. Thereafter, a regression coefficient vector composed of the regression coefficients for the twenty standard patterned phonemes and for a certain frame is determined. The regression coefficient vector is a twenty-dimensional vector having the regression coefficients as elements. Thereafter, the regression coefficient vector is calculated for each of frames.

Thereafter, twenty elements of each of the regression coefficient vectors are respectively divided by a vector length of a corresponding regression coefficient vector in the normalized regression coefficient vector calculating unit 18 to normalize the vector length of each of the regression coefficient vectors to a unity. Therefore, a normalized regression coefficient vector having twenty normalized regression coefficients as normalized elements is formed for each of frames, and a time series of normalized regression coefficient vectors is formed.

Thereafter, in the input voice parameter series producing unit 19, the time series of normalized similarity vectors calculated in the calculating unit 16 and the time series of normalized regression coefficient vectors calculated in the calculating unit 18 are regarded as a time series of input voice parameters.

The voice recognition apparatus 11 is further provided with a standard patterned voice piece storing unit 20 for storing a plurality of standard patterned voice pieces produced according to pieces of feature parameter data obtained by analyzing referential voices of a small number of specified persons, a vocal symbol series storing unit 21 for storing a plurality of series of vocal symbols which each indicate a series of voice pieces of a word to be recognized, a standard patterned word storing unit 22 for storing a plurality of standard patterned words to be collated with the input voice which each are produced by connecting a plurality of standard patterned voice pieces stored in the storing unit 20 in series according to a series of vocal symbols stored in the storing unit 21 which indicates the arrangement of the standard patterned voice pieces for each of the standard patterned words and storing a time series of standard normalized vectors and a time series of standard normalized regression coefficient vectors as a time series of standard parameters for each of the standard patterned words, an inter-frame similarity calculating unit 23 for calculating an inter-frame similarity between the time series of input voice parameters produced in the producing unit 19 and the time series of standard parameters stored in the storing unit 22 for each of the standard patterned words stored in the storing unit 22, a dynamic programming (DP) matching unit 24 for performing a continuous dynamic programming (DP) matching operation to obtain an accumulated similarity from the inter-frame similarity calculated in the calculating unit 23 for each of the standard patterned words stored in the storing unit 22, and a normalized word similarity calculating unit 25 for calculating a final accumulated similarity from the accumulated similarity obtained in the matching unit 24 for each of the standard patterned words stored in the storing unit 22, obtaining a normalized word similarity S for each of the standard patterned words, selecting a particular normalized word similarity for a particular standard patterned word having a maximum value from among the normalized word similarities S, and outputting the particular standard patterned word as a recognized word.

In the above configuration, a plurality of standard patterned voice pieces (in other words, standard patterned voice units) are stored in advance in the standard patterned voice piece storing unit 20. Voice pieces including the standard patterned voice pieces are generally classified into a vowel-consonant pattern (VC pattern), a consonant-vowel pattern (CV pattern) and a vowel-vowel pattern (VV pattern). The VC pattern is defined as voice piece types respectively ranging from a time center of a vowel to a time center of a consonant, the CV pattern is defined as voice piece types respectively ranging from a time center of a consonant to a time center of a vowel, and the VV pattern is defined as voice piece types respectively ranging from a time center of a fore vowel to a time center of a rear vowel. The standard patterned voices are extracted from a time series of normalized standard similarity vectors and a time series of normalized standard regression coefficient vectors formed by utilizing the twenty types standard patterned phonemes and pieces of vocal data.

In detail, a small number of specified persons vocalize a set of words determined by considering phonemic circumstances, and referential voices of the specified persons are analyzed to obtain pieces of feature parameter data. Thereafter, a phoneme similarity between a standard patterned phoneme and the feature parameter data is calculated for each of the twenty types standard patterned phonemes and for each of frames. Thereafter, a time series of normalized standard similarity vectors and a time series of normalized standard regression coefficient vectors are formed by performing the same operations as those performed in the calculating units 15 to 18. Thereafter, standard voice pieces belonging to the same voice piece type are extracted from the time series of normalized standard similarity vectors and the time series of normalized standard regression coefficient vectors, and the standard voice pieces are averaged by time-matching the standard voice pieces to each other according to a dynamic programming (DP) matching operation to produce a standard patterned voice piece. The standard patterned voice piece is produced for each of the voice piece types. Thereafter, the standard patterned voice pieces are stored in the standard patterned voice piece storing unit 20.

Accordingly, because a plurality of standard voice pieces belonging to the same voice piece type are averaged, reliability of a dictionary formed of the standard patterned voice pieces is enhanced, and the input voice can be recognized wit a high accuracy.

Also, because the standard voice pieces are classified into the VC pattern, the CV pattern and the VV pattern, a time series of voice pieces is divided at central frames of phonemes. Therefore, variations of voice pieces from a consonant to a vowel and from a vowel to a consonant can be effectively detected, so that the input voice can be recognized wit a high accuracy.

An example of the division of a first Japanese word denoting the morning sun in English, an example of the division of a second Japanese word denoting an alcoholic drink in English and an example of a third Japanese word are shown in FIG. 4A. The specified persons pronounce the first Japanese word as "ASAHI", pronounce the second Japanese word as "SAKE", and pronounce the third Japanese word as "PAAKU".

As shown in FIG. 4A, the pronunciation "ASAHI" is composed of voice pieces written by vocal symbols /<A/, /AS/, /SA/, /AH/, /HI/ and /I>/, the pronunciation "SAKE" is composed of voice pieces written by vocal symbols /<SA/, /AK/, /KE/ and /E>/, and the pronunciation "PAAKU" is composed of voice pieces written by vocal symbols /<PA/, /AA/, /AK/, /KU/ and /U>/. Here a symbol "<" denotes the start of a voice, and a symbol ">" denotes the ending of a voice. Many series of vocal symbols respectively denoting the pronunciation of a word in a group of words to be recognized are stored in advance in the word dictionary storing unit 21. Therefore, a plurality of standard patterned voice pieces are picked up from the storing unit 20 according to a series of vocal symbols which is stored in the storing unit 21 and is required to form a standard patterned word, and the standard patterned voice pieces picked up are stored in the standard patterned word storing unit 22 as the standard patterned word. A plurality of sets of standard patterned voice pieces are stored in the storing unit 22 as a plurality of standard patterned words required to be recognized in the voice recognition. For example, in cases where a standard patterned word "red" pronounced by "AKAI" in Japan is stored in the storing unit 22, a series of vocal symbols /<A/, /AK/, /KA/, /AI/ and /I>/ is specified, and a series of standard patterned voice pieces written by the series of vocal symbols is selected from the storing unit 20, and the series of standard patterned voice pieces is stored in the storing unit 22 as the standard patterned word "red". The series of standard patterned voice pieces indicating the standard patterned word "red" is shown in FIG. 4B. As shown in FIG. 4B, each of the standard patterned word "red" is expressed by a time series of standard normalized similarity vectors and a time series of standard normalized regression coefficient vectors.

Accordingly, because a series of vocal symbols is specified to connect a plurality of standard patterned voice pieces to each other for the purpose of forming a series of standard patterned voice pieces which denotes a standard patterned word, the alteration of the standard patterned words can be easily performed.

Thereafter, the time series of input voice parameters produced in the producing unit 19 is collated with a time series of standard patterned voice pieces composing a standard patterned word stored in the storing unit 22 in the inter-frame similarity calculating unit 23 to calculate an inter-frame similarity between the time series of input voice parameters and the time series of standard patterned voice pieces. To determine a distance scale of the inter-frame similarity, a Euclidean distance, a weighted Euclidean distance or a correlation cosine distance is utilized. In this prior art, a case that the correlation cosine distance is utilized is described.

A normalized similarity vector $a_j$ of the input voice at a j-th frame is expressed according to an equation (5).

$$a_j=(a_1, a_2, \cdots, a_{20}) \quad (5)$$

A standard normalized similarity vector $b_i$ of a standard patterned word stored in the storing unit 22 at an i-th frame is expressed according to an equation (6).

$$b_i=(b_1, b_2, \cdots, b_{20}) \quad (6)$$

A normalized regression coefficient vector $c_j$ of the input voice at the j-th frame is expressed according to an equation (7).

$$c_j=(c_1, c_2, \cdots, c_{20}) \quad (7)$$

A standard normalized regression coefficient vector $d_i$ of the standard patterned word stored in the storing unit 22 at the i-th frame is expressed according to an equation (8).

$$d_i=(d_1, d_2, \cdots, d_{20}) \quad (8)$$

In this case, an inter-frame similarity $l(i,j)$ expressed by the correlation cosine distance is expressed according to an equation (9).

$$l(i,j) = w1 \frac{a_j \cdot b_i}{|a_j|*|b_i|} + w2 \frac{c_j \cdot d_i}{|c_j|*|d_i|} \quad (9)$$

$$(w1 + w2 = 1, 0 \leq w1, w2 \leq 1)$$

The symbol w1 denotes a weighting factor for a mix of the phoneme similarities and the standard phoneme similarities, and the symbol w2 denotes a weighting factor for a mix of the regression coefficients and the standard regression coefficients. The weighting factor w1 ranging from 0.4 to 0.6 is preferable. In this case, because the vectors $a_j, b_i, c_j$ and $d_i$ are normalized, values $|a_j|*|b_i|$ and $|c_j|*|d_i|$ are respectively equal to 1. Therefore, the correlation cosine of the normalized similarity vector $a_j$ and the standard normalized similarity vector $b_i$ is equivalent to an inner product of the normalized similarity vector $a_j$ and the standard normalized similarity vector $b_i$, and the correlation cosine of the normalized regression coefficient vector $c_j$ and the standard normalized regression coefficient vector $d_i$ is equivalent to an inner product of the normalized regression coefficient vector $c_j$ and the standard normalized regression coefficient vector $d_i$. As a result, the equation (9) is rewritten to an equation (10).

$$l(i,j) = w1 \, a_j \cdot b_i + w2 \, c_j \cdot d_i \quad (10)$$

$$(w1 + w2 = 1, 0 \leq w1, w2 \leq 1)$$

Thereafter, a continuous DP matching operation is performed in the DP matching unit 24 by utilizing the inter-frame similarity $l(i,j)$ calculated in the calculating unit 23 to obtain a word similarity for each of standard patterned words and for each of frames. The continuous DP matching operation is described with reference to FIG. 5A.

As shown in FIG. 5A, a plurality of lattice points $P(i,j)$ placed at intersections of frames of a standard patterned word and frames of the input voice are defined, and a value of an inter-frame similarity $l(i,j)$ is allocated at each lattice point $P(i,j)$. Here a length of the standard patterned word is equivalent to I frames and a length of the input voice is equivalent to J frames. Also, a dynamic programming (DP) matching path extends from a starting lattice point $Ps(j=1, i=1)$ to a final lattice point $Pf(j=J, i=I)$ through a plurality of lattice points. In the continuous DP matching operation, values of inter-frame similarities allocated at lattice points on the DP matching path are accumulated while passing along the DP matching path. Also, an example of a concept of an asymmetrical DP matching path is shown in FIG. 5B. In the concept of the asymmetrical DP matching path, three matching paths reaching a lattice point $P(i_o, j_o)$ are representatively defined. A first path extends from a lattice point $P(i_o-1, j_o-2)$ to the lattice point $P(i_o, j_o)$, a second path extends from a lattice point $P(i0-1, j0-1)$ to the lattice point $P(i_o, j_o)$, a third path extends from a lattice point $P(i_o-2, j_o)$ to the lattice point $P(i0, j0)$ through a lattice point $P(i_o-1, j_o)$. That is, the DP matching path according to the concept of the asymmetrical DP matching path is based on a standard patterned word and passes through the lattice points arranged in a time direction of the standard patterned word one by one.

In cases where the concept of the asymmetrical DP matching path shown in FIG. 5B is utilized for the DP matching path, one of the matching paths is selected in the continuous DP matching operation on condition that an accumulated value of the inter-frame similarities is maximized. A DP matching path extending from the starting point (j=1,i=1) to the final point (j=J,i=I) on condition that an accumulated value of the inter-frame similarities is maximized is called an optimum DP matching path.

An accumulating calculation along the optimum DP matching path according to the continuous DP matching operation is described in detail as follows. An accumulated inter-frame similarity $g(i,j)$ at the lattice point $P(i,j)$ is calculated according to a recurrence formula utilized in the continuous DP matching operation and is expressed according to an equation (11).

$$g(i,j)=\max\{g(i-1,j-2)+l(i,j), g(i-1,j-1)+l(i,j), g(i-2,j-1)+l(i-1,j)+l(i,j)\} \quad (11)$$

Thereafter, a final accumulated similarity obtained according to the recurrence formula (11) is regarded as a word similarity for the standard patterned word in the normalized word similarity calculating unit 25. That is, a final accumulated similarity $g(I,j)$ at a final frame I of the standard patterned word is equal to a final accumulated similarity at an ending time j for the standard patterned word. After an ending position of the input voice is detected, a frame position j at which the accumulated similarity $g(I,j)$ is maximized is determined (j=J), and a maximized accumulated similarity $g(I,j)$ is normalized by dividing the maximized accumulated similarity $g(I,j)$ by the frame length I of the standard patterned word to obtain a normalized word similarity S. The normalized word similarity S obtained in the calculating unit 25 is expressed according to an equation (12).

$$S = \left\{ \max_j [g(I,j)] \right\} / I \quad (12)$$

The normalized word similarity S is calculated for each of the standard patterned words to be collated with the input voice. Thereafter, a word maximizing the normalized word similarity S is output as a recognized word.

2.2. Problems to be Solved by the Invention

However, though a correct word corresponding to the input voice is recognized with a high accuracy in cases where starting and ending positions of the input voice are clearly informed, there is a drawback that a correct word corresponding to the input voice is not reliably recognized in cases where a part of vocalized word included in the input voice is picked out from the input voice according to the continuous DP matching operation because starting or ending position of the vocalized word in the input voice is not clearly detected. The reason that the correct word is not reliably recognized in cases where the starting or ending position of the vocalized word in the input voice is not clearly detected is as follows.

In the above voice recognizing method performed in the voice recognition apparatus 11, the correlation cosine distance is utilized as a distance scale of the inter-frame similarity. Therefore, when a noise having a low voice power is input to the apparatus 11, a length of an undesired similarity vector at an undesired frame corresponding to the noise is normalized to a unity. In this case, there is a high possibility that the vocalized word, which is processed to a plurality of normalized similarity vectors including a normalized undesired similarity vector, matches with a false word.

Also, because the input voice is converted into the phoneme similarities to match a vocalized word included in the input voice to a word, pieces of voice power information such as a differential power are lost when the vocalized word of the input voice is matched to a word. Therefore, the starting or ending position of the vocalized word in the input voice is not clearly detected, and there is a drawback that a correct word corresponding to the vocalized word of the input voice is not reliably recognized.

SUMMARY OF THE INVENTION

An object of the present invention is to provide, with due consideration to the drawbacks of such a conventional voice recognizing method, a voice recognizing method in which a correct word corresponding to an input voice is reliably recognized by performing the continuous DP matching operation.

The object is achieved by the provision of a voice recognizing method in which a word included in an input voice is recognized, comprising the steps of:

preparing a plurality of standard patterned words to be collated with an input voice, each of the standard patterned words being formed of a time series of standard patterned voice pieces;

producing a time series of input voice parameters from the input voice;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values;

accumulating the posterior probability similarities according to a continuous dynamic programing matching operation to obtain a word similarity for each standard patterned word;

selecting a maximum word similarity having a maximum value from among the word similarities defined for the standard patterned words, the maximum word similarity being obtained by accumulating the posterior probability similarities for the correct standard patterned word; and outputting the correct standard patterned word as a recognized word of the input voice.

In cases where a pseudo-word similar to a short word exists in a long word of the input voice, there is a high probability in the prior art that the pseudo-word is erroneously recognized as the short word.

In the above steps according to the present invention, a posterior probability similarity is produced for each analyzing time and for each standard patterned word by subtracting a constant value from each of the inter-frame similarities. In this case, the posterior probability similarities for a correct standard patterned word have positive values, and the posterior probability similarities for false standard patterned words have negative value. Therefore, an accumulated value of the posterior probability similarities for the correct standard patterned word is increased as the posterior probability similarities are accumulated. In contrast, an accumulated value of the posterior probability similarities for each of the false standard patterned word is decreased as the posterior probability similarities are accumulated.

Accordingly, a long word existing in the input voice is advantageously recognized more than a short word existing in the input voice because a first value of a word similarity for the long word is higher than a second value of another word similarity for the short word. That is, even though a pseudo-word similar to a short word exists in a long word of the input voice, there is no probability that the pseudo-word is erroneously recognized as the short word because the accumulated value of the word similarity S for the long word is necessarily larger than that of the word similarity S for the pseudo-word.

Also, in cases where a pseudo-word of the input voice composed of a fore word and undesired false-word following the fore word matches with a standard patterned word, an accumulated value of a word similarity is gradually decreased after the word similarity reaches a maximum value at an end position of the fore word. Therefore, there is no probability that the word similarity reaches a high value even though a long word having an unnecessary length in the input voice matches with a standard patterned word. In other words, there is no probability that a long word having an unnecessary length is recognized as a correct word.

The object is also achieved by the provision of a voice recognizing method in which a word included in an input voice is recognized, comprising the steps of:

preparing a plurality of standard patterned phonemes;

extracting a group of standard feature parameters from pieces of voice data obtained from voices of a small number of specified persons for each analyzing time, a standard differential voice power defined by differentiating a standard voice power with respect to time being included in the group of standard feature parameters;

calculating a standard phoneme similarity between the group of standard feature parameters and a standard patterned phoneme for each analyzing time and for each standard patterned phoneme;

producing a plurality of standard patterned words to be collated with an input voice according to the phoneme similarities, each of the standard patterned words being formed of a time series of standard patterned voice pieces, and each of the standard patterned voice pieces being composed of the phoneme similarities for the standard patterned phonemes;

extracting a group of feature parameters from an input voice for each analyzing time, a differential voice power defined by differentiating a voice power with respect to time being included in the group of feature parameters;

storing a time series of differential voice powers relating to the input voice;

calculating a phoneme similarity between the group of feature parameters and a standard patterned phoneme for each analyzing time and for each standard patterned phoneme;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of differential voice powers, the time series of similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word, each of the inter-frame similarities having a differential voice power similarity between a differential voice power and a standard differential voice power at the same analyzing time;

accumulating the inter-frame similarities according to a continuous dynamic programing matching operation to obtain a word similarity for each standard patterned word;

selecting a maximum word similarity having a maximum value from among the word similarities defined for the standard patterned words, the maximum word similarity being obtained by accumulating the inter-frame similarities for a correct standard patterned word; and outputting the correct standard patterned word as a recognized word of the input voice.

In the prior art, a sum of the correlation cosine of the normalized similarity vectors for the input voice and the standard patterned word and the correlation cosine of the normalized regression coefficient vectors for the input voice and the standard patterned word is merely utilized as a distance scale in the continuous DP matching operation, and any voice power is not utilized. In contrast, in the present invention, a differential voice power obtained for each analyzing time is additionally utilized as a distance scale in the continuous DP matching operation. An effect obtained by additionally utilizing the differential voice power is described as follows.

A voice power is generally low in a non-voice period and is high at a voice period. In particular, a voice power of a vowel or a nasal is very high. Also, in case of voiceless bursting phonemes /p/, /t/ and /k/ and a voiceless affricate /c/, a voice power is considerably lowered just before a burst, and a voice power is rapidly increased after the burst. Therefore, as is well-known, a voice power is useful for recognizing a voice. However, a voice power of a voice uttered by a person differ from that uttered by another person. Therefore, a differential voice power defined by differentiating a voice power with respect to time is additionally utilized as a distance scale in the continuous DP matching operation. That is, a differential voice power is rapidly increased at a starting point of the voice period in the input voice, and a differential voice power is rapidly decreased at an ending point of the voice period in the input voice. Therefore, even though a plurality of words or noises are included in the input voice, a word can be reliably picked up from the input voice.

In the above steps, an inter-frame similarity having a differential voice power similarity between a differential voice power and a standard differential voice power is obtained for each analyzing time and for each standard patterned word. Therefore, the inter-frame similarities ranging from a starting point of a word in the input voice to an ending point of the word can be reliably accumulated for each standard patterned word to obtain a word similarity.

Accordingly, a word can be reliably picked up from the input voice.

The object is also achieved by the provision of a voice recognizing method in which a word included in an input voice is recognized, comprising the steps of:

preparing a plurality of standard patterned words to be collated with an input voice, each of the standard patterned words being formed of a time series of standard patterned voice pieces;

preparing a plurality of standard patterned phonemes;

extracting a group of feature parameters from the input voice for each analyzing time;

calculating a phoneme similarity between the group of feature parameters and a standard patterned phoneme for each analyzing time and for each standard patterned phoneme;

selecting a maximum phoneme similarity from among the phoneme similarities for all of the standard patterned phonemes at the same analyzing time, the maximum phoneme similarity being obtained for each analyzing time;

producing a weighting factor from each of the maximum phoneme similarities for each analyzing time, a weighting factor produced from a first maximum phoneme similarity being equal to or larger than another weighting factor produced from a second maximum phoneme similarity of which a value is lower than that of the first maximum phoneme;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values;

weighting each of the posterior probability similarities at an analyzing time with the weighting factor at the same analyzing time for each standard patterned word to produce a weighted posterior probability similarity for each analyzing time and for each standard patterned word;

accumulating the weighted posterior probability similarities according to a continuous dynamic programing matching operation to obtain a word similarity for each standard patterned word;

selecting a maximum word similarity having a maximum value from among the word similarities defined for the standard patterned words, the maximum word similarity being obtained by accumulating the weighted posterior probability similarities for the correct standard patterned word; and outputting the correct standard patterned word as a recognized word of the input voice.

In the above steps, a maximum phoneme similarity is selected from among the phoneme similarities for all of the standard patterned phonemes at the same analyzing time. In this case, a maximum phoneme similarity for an analyzing time relating to a voice period of the input voice has a high value because a group of feature parameters for the voice period is similar to one of the standard patterned words. In contrast, a maximum phoneme similarity for an analyzing time relating to a noise period of the input voice has a low value because a group of feature parameters for the noise period considerably differs from any of the standard patterned words.

Thereafter, each of the posterior probability similarities at an analyzing time is weighted with the weighting factor at the same analyzing time to produce a weighted posterior probability similarity for each analyzing time and for each standard patterned word. Therefore, a value of a weighted posterior probability similarity for the voice period is heightened, and a value of a weighted posterior probability similarity for the noise period is lowered.

Accordingly, even though noises are included in the input voice, a word can be reliably picked up from the input voice.

The object is also achieved by the provision of a voice recognizing method in which a word included in an input voice is recognized, comprising the steps of:

preparing a plurality of standard patterned words to be collated with an input voice, each of the standard patterned words being formed of a time series of standard patterned voice pieces;

preparing N standard patterned phonemes;

preparing a standard patterned noise;

extracting a group of feature parameters from the input voice for each analyzing time;

calculating a phoneme similarity $d_P$ (P=1 to N) between the group of feature parameters and one of the standard patterned phonemes for each analyzing time and for each standard patterned phoneme;

calculating a noise similarity Xn between the group of feature parameters and the standard patterned noise for each analyzing time;

producing an N-dimensional normalized similarity vector a having N normalized phoneme similarities $a_P$ at the same analyzing time as elements for each analyzing time, each of the normalized phoneme similarities $a_P$ being determined according to an equation $$a_P = d_P / (d_1^2 + d_2^2 + \ldots + d_N^2 + Xn^2)^{1/2}, \text{ and}$$

the N-dimensional normalized similarity vector $a_P$ being expressed by $a = (a_1, a_2, \ldots, a_N)$;

producing a time series of normalized similarity vectors relating to the input voice;

producing a regression coefficient vector from the phoneme similarities for each analyzing time;

producing a time series of regression coefficient vectors relating to the input voice;

producing a time series of input voice parameters composed of the time series of normalized similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values;

accumulating the posterior probability similarities according to a continuous dynamic programing matching operation to obtain a word similarity for each standard patterned word;

selecting a maximum word similarity having a maximum value from among the word similarities defined for the standard patterned words, the maximum word similarity being obtained by accumulating the posterior probability similarities for the correct standard patterned word; and outputting the correct standard patterned word as a recognized word of the input voice.

In the above steps, a noise similarity Xn between the group of feature parameters and the standard patterned noise is calculated for each analyzing time. In this case, because the group of feature parameters of the input voice for an analyzing time relating to a voice period of the input voice is not similar to the standard patterned noise, a value of the noise similarity Xn for the voice period is low. Also, because the group of feature parameters of the input voice for an analyzing time relating to the voice period of the input voice is similar to one of the standard patterned phonemes, a value of one of the phoneme similarities $d_P$ for the voice period is high. In contrast, because the group of feature parameters of the input voice for an analyzing time relating to a noise period of the input voice is similar to the standard patterned noise, a value of the noise similarity Xn for the noise period is high. Also, because the group of feature parameters of the input voice for an analyzing time relating to the noise period of the input voice is not similar to any of the standard patterned phonemes, values of the phoneme similarities $d_P$ for the noise period is low.

Thereafter, an N-dimensional normalized similarity vector a having N normalized phoneme similarities $a_p$ is calculated for each analyzing time. In this case, because a value of the noise similarity Xn for the voice period is low and a value of one of the phoneme similarities $d_P$ for the voice period is high, a vector length of the N-dimensional normalized similarity vector a for the voice period is almost equal to a unity. In contrast, because a value of the noise similarity Xn for the noise period is high and because values of the phoneme similarities $d_P$ for the noise period is low, a vector length of the N-dimensional normalized similarity vector a for the noise period is low.

Therefore, values of the inter-frame similarities for the analyzing time relating to the voice period of the input voice become high, and values of the inter-frame similarities for the analyzing time relating to the noise period of the input voice become low. Therefore, the posterior probability similarities for the analyzing time relating to the voice period of the input voice have high positive values. In contrast, the posterior probability similarities for the analyzing time relating to the noise period of the input voice have negative values of which absolute values are high.

Accordingly, even though noises are included in the input voice, a word can be reliably picked up from the input voice.

The object is also achieved by the provision of a voice recognizing method in which a word included in an input voice is recognized, comprising the steps of:

preparing a plurality of standard patterned phonemes;

extracting a group of standard feature parameters from pieces of voice data obtained from voices of a small number of specified persons for each analyzing time, a standard differential voice power defined by differentiating a standard voice power with respect to time being included in the group of standard feature parameters;

calculating a standard phoneme similarity between the group of standard feature parameters and one of the standard patterned phonemes for each analyzing time and for each standard patterned phoneme;

producing a plurality of standard patterned words to be collated with an input voice according to the phoneme similarities, each of the standard patterned words being formed of a time series of standard patterned voice pieces, and each of the standard patterned voice pieces being composed of the phoneme similarities for the standard patterned phonemes;

extracting a group of feature parameters from an input voice for each analyzing time, a differential voice power defined by differentiating a voice power with respect to time being included in the group of feature parameters;

storing a time series of differential voice powers relating to the input voice;

calculating a phoneme similarity between the group of feature parameters and one of the standard patterned phonemes for each analyzing time and for each standard patterned phoneme;

selecting a maximum phoneme similarity from among the phoneme similarities for all of the standard patterned phonemes at the same analyzing time, the maximum phoneme similarity being obtained for each analyzing time;

producing a weighting factor from each of the maximum phoneme similarities for each analyzing time, a weighting factor produced from a first maximum phoneme similarity being equal to or larger than another weighting factor produced from a second maximum phoneme similarity of which a value is lower than that of the first maximum phoneme;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of differential voice powers, the time series of similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word, each of the inter-frame similarities having a differential voice power similarity between a differential voice power and a standard differential voice power at the same analyzing time;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values, and weighting each of the posterior probability similarities at an analyzing time with the weighting factor at the same analyzing time for each standard patterned word to produce a weighted posterior probability similarity for each analyzing time and for each standard patterned word;

accumulating the weighted posterior probability similarities according to a continuous dynamic programing matching operation to obtain a word similarity for each standard patterned word;

selecting a maximum word similarity having a maximum value from among the word similarities defined for the standard patterned words, the maximum word similarity being obtained by accumulating the weighted posterior probability similarities for the correct standard patterned word; and outputting the correct standard patterned word as a recognized word of the input voice.

In the above steps, a time series of differential voice powers is included in a time series of input voice parameters. Therefore, the inter-frame similarities ranging from a starting point of a word in the input voice to an ending point of the word can be reliably accumulated for each standard patterned word to obtain a word similarity.

Also, each of the posterior probability similarities at an analyzing time is weighted with the weighting factor. Therefore, a value of a weighted posterior probability similarity for the voice period is heightened, and a value of a weighted posterior probability similarity for the noise period is lowered.

Accordingly, even though noises are included in the input voice, a word can be reliably picked up from the input voice.

BRIEF DESCRIPTION OF THE DRAWINGS

The objects, features and advantages of the present invention will be apparent from the following description taken in conjunction with the accompanying drawings, in which.

DESCRIPTION OF THE PREFERRED EMBODIMENTS

Figure 1:
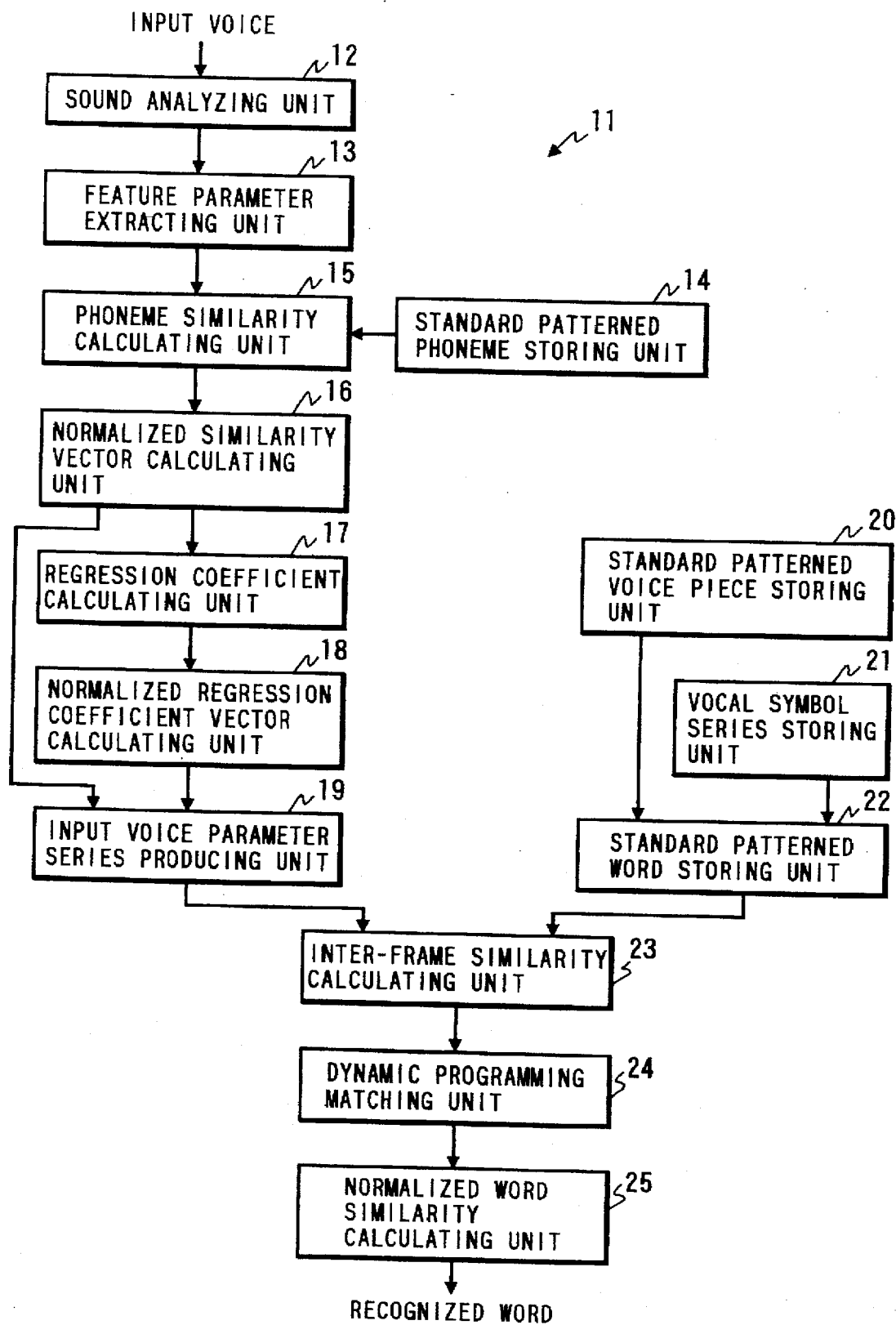
FIG. 1 is a block diagram of a voice recognizing apparatus in which an input voice is recognized according to a conventional voice recognizing method.
Figure 2:
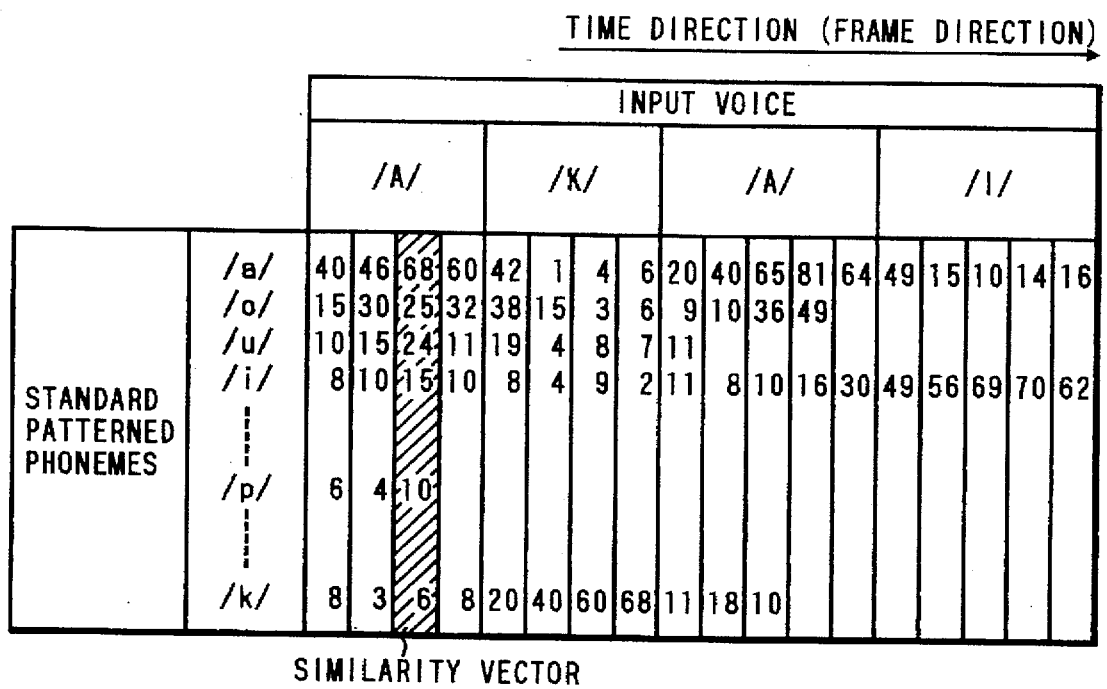
FIG. 2 shows a time series of similarity vectors which is composed of phoneme similarities obtained in a phoneme similarity calculating unit shown in FIG. 1, a phoneme similarity being calculated for each of standard patterned phonemes and for each of frames of the input voice.
Figure 3:
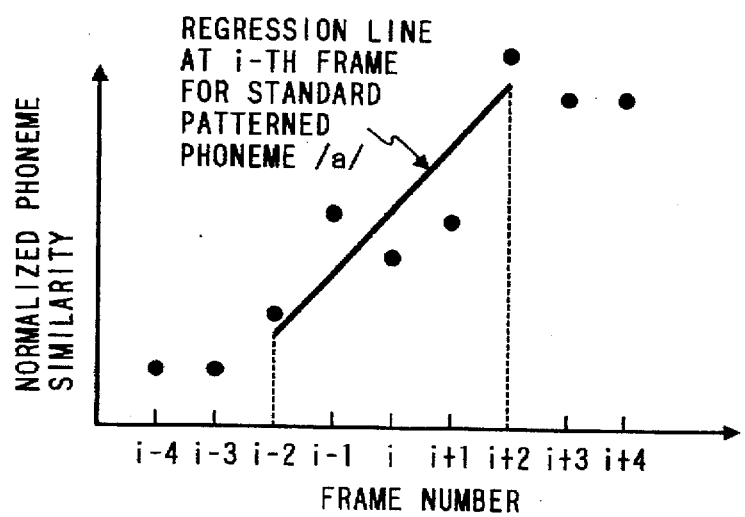
FIG. 3 shows a regression coefficient for an i-th frame and a standard patterned phoneme /a/.
Figure 4A:
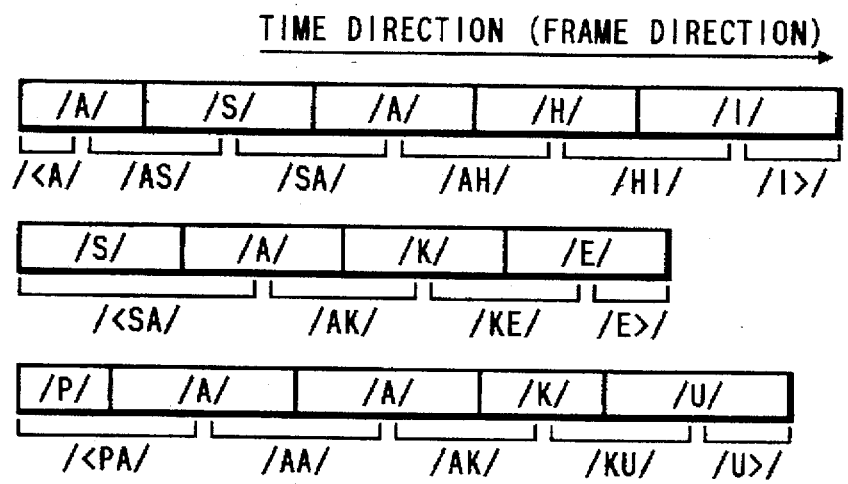
FIG. 4A shows voice pieces of a voice "ASAHI" classified into a vowel-consonant pattern (VC pattern) and a consonant-vowel pattern (CV pattern), voice pieces of a voice "SAKE" classified into the VC pattern and the CV pattern, and voice pieces of a voice "PAAKU" classified into the VC pattern, the CV pattern and a vowel-vowel pattern (VV pattern)
Figure 4B:
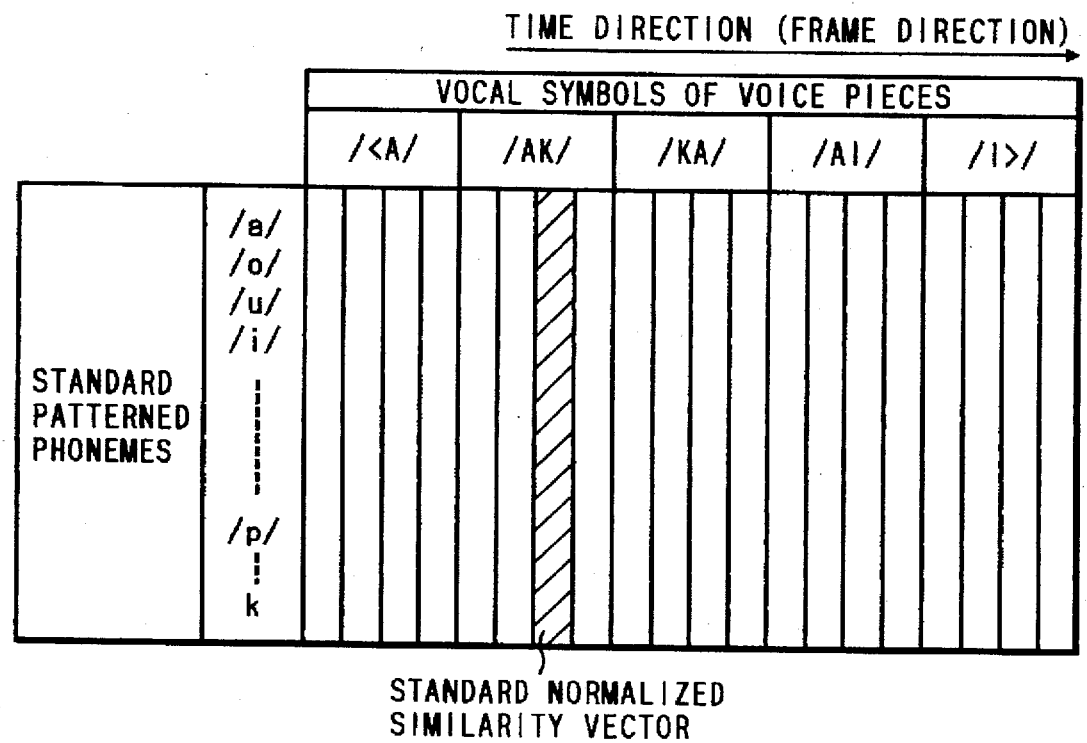
FIG. 4B shoes a series of standard patterned voice pieces indicating a standard patterned word "red"

Preferred embodiments of a voice recognizing method according to the present invention are described with reference to drawings. Constructional units shown in following drawings which are identical with the constructional units shown in FIG. 1 are denoted by the same reference signs as those shown in FIG. 1. Also, a DP matching path according to the concept of the asymmetrical DP matching path shown in FIG. 5B is adopted in following embodiments.

Figure 6:
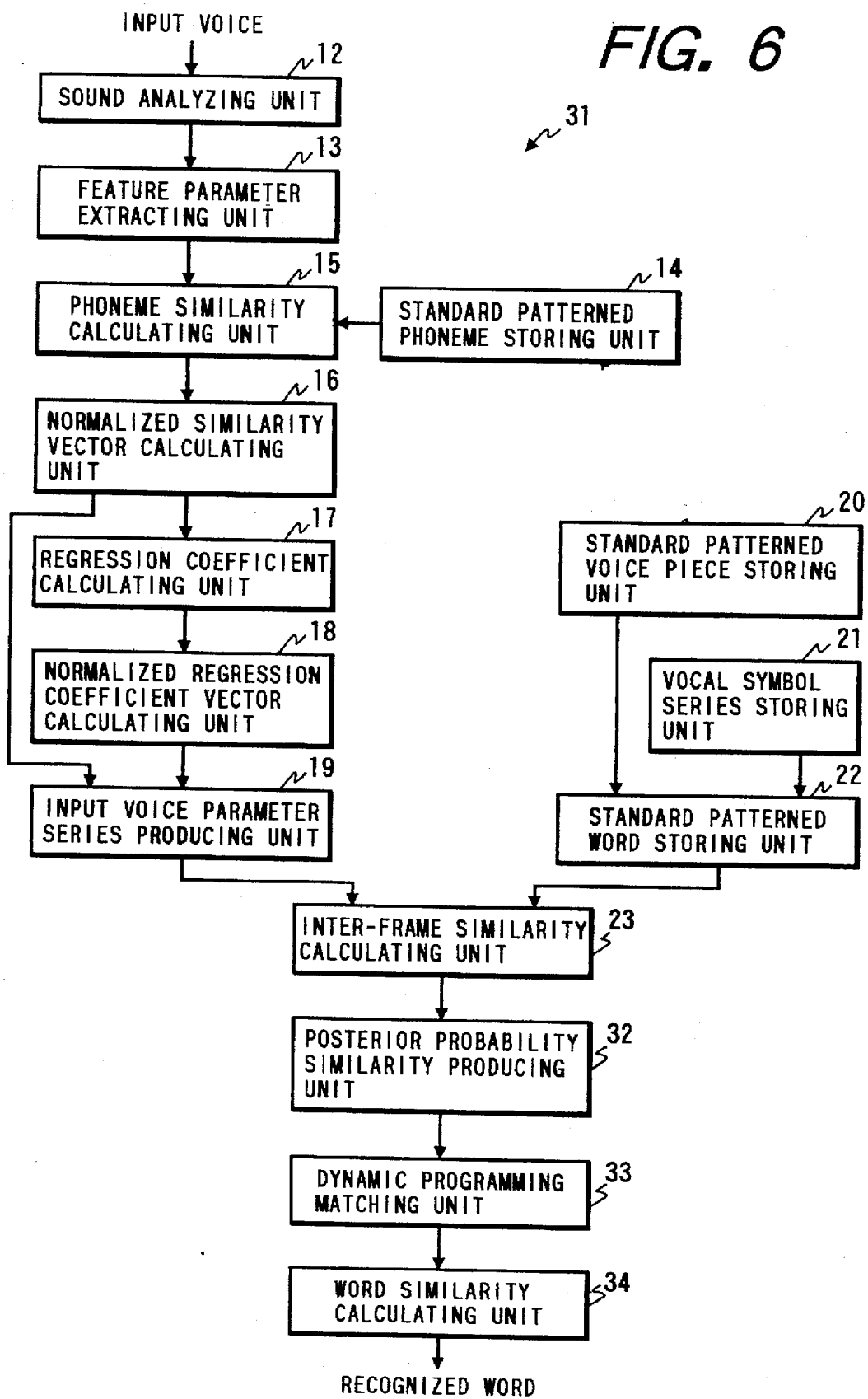
FIG. 6 is a block diagram of a voice recognizing apparatus in which an input voice is recognized according to a voice recognizing method of a first embodiment.

FIG. 6 is a block diagram of a voice recognizing apparatus in which an input voice is recognized according to a voice recognizing method of a first embodiment.

As shown in FIG. 6, a voice recognition apparatus 31 comprises the sound analyzing unit 12, the feature parameter extracting unit 13, the standard patterned phoneme storing unit 14, the phoneme similarity calculating unit 15, the normalized similarity vector calculating unit 16, the regression coefficient calculating unit 17, the normalized regression coefficient vector calculating unit 18, the input voice parameter series producing unit 19, the standard patterned voice piece storing unit 20, the vocal symbol series storing unit 21, the standard patterned word storing unit 22, the inter-frame similarity calculating unit 23, a posterior probability similarity producing unit 32 for producing a posterior-probability similarity lp from the inter-frame similarity calculated in the calculating unit 23, a DP matching unit 33 for performing a continuous dynamic programming (DP) matching operation to obtain an accumulated similarity g(i,j) from the posterior-probability similarity $l_p$ calculated in the producing unit 32 for each of the standard patterned words stored in the storing unit 22, and a word similarity calculating unit 34 for calculating a final accumulated similarity from the accumulated similarity obtained in the matching unit 33 for each of the standard patterned words stored in the storing unit 22, obtaining a word similarity S=g(I,J) for each of the standard patterned words, selecting a particular word similarity for a particular standard patterned word having a maximum value from among the word similarities S, and outputting the particular standard patterned word as a recognized word.

In the above configuration, the inter-frame similarity l(i,j) formulated according to the equation (10) is calculated according to a voice recognizing method of the present invention in the same manner as the conventional voice recognizing method.

Thereafter, a posterior probability P(K|X) defined as a probability that an inter-frame similarity X, between the time series of input voice parameters produced in the producing unit 19 and the time series of standard patterned voice pieces denoting a standard patterned word stored in the storing unit 22, obtained as a sum of correlation cosines in the same manner as the equation (9) exists on an optimum DP matching path is produced in the posterior probability similarity producing unit 32.

The posterior probability P(K|X) is expressed in the posterior probability similarity producing unit 32 according to a Bayesian formula in an equation (13).

$$P(K|X) = \{P(X|K)/P(X)\} * P(K) \tag{13}$$

Here the symbol P(X|K) denotes an occurrence probability of the inter-frame similarity X on a correct DP matching path, and the symbol P(X) denotes an occurrence probability of the inter-frame similarity X at all of lattice points. Therefore, an occurrence probability P(K) denotes a probability that the correct DP matching path exists, and the occurrence probability P(K) is constant.

The equation (13) is rewritten to an equation (14) according to a logarithmic expression.

$$\log_e\{P(K|X)\}=\log_e\{P(X|K)/P(X)\}+\log_e\{P(K)\} \quad (14)$$

When an inter-frame similarity $X=X_o$ for satisfying $P(X_o|K)=P(X_o)$ is obtained, a first term of the right side in the equation (14)

$$\log_e\{P(X|K)/P(X)\} \quad (15)$$

is zero. When an inter frame similarity $X=X_1$ for satisfying $P(X_1|K)>P(X_1)$ is obtained (in other word, when the occurrence probability of the inter-frame similarity X on the correct DP matching path is higher than the occurrence probability of the inter-frame similarity X at all of lattice points), the first term is positive. When an inter frame similarity $X=X_2$ for satisfying $P(X_2|K)<P(X_2)$ is obtained (in other word, when the occurrence probability of the inter-frame similarity X on the correct DP matching path is lower than the occurrence probability of the inter-frame similarity X at all of lattice points), the first term is negative. Therefore, a value of the first term varies around the zero, so that the first term can be utilized as a criterion for judging whether or not the input voice correctly matches with a standard patterned word stored in the storing unit 22. In contrast, because a second term $\log_e\{P(K)\}$ of the right side in the equation (14) denotes a probability that a correct lattice exists and is constant, the second term has no connection with a degree of the matching between the input voice and a standard patterned word stored in the storing unit 22. Therefore, a word similarity S is defined as a sum of values of first terms at lattice points on the optimum DP matching path in the present invention. The word similarity S is expressed according to an equation (16).

$$S = \sum_{(\hat{i},\hat{j})} \log_e\{P(X\hat{i},\hat{j}|K)/P(X\hat{i},\hat{j})\} \quad (16)$$

Figure 5A:
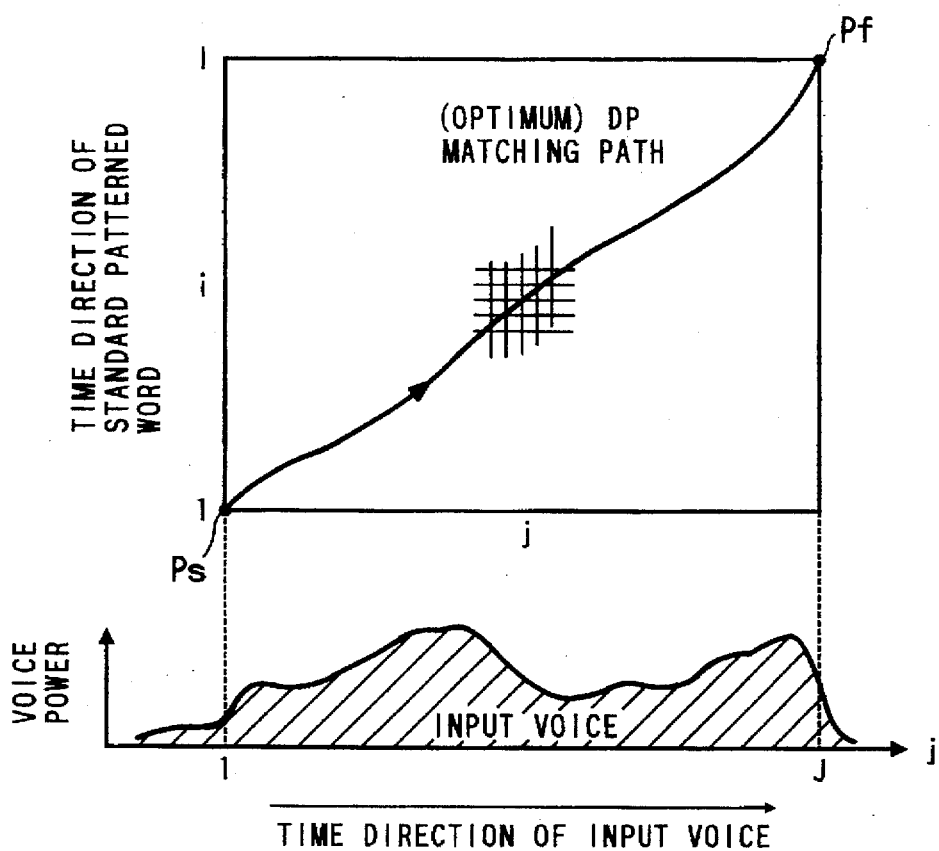
FIG. 5A shows a dynamic programming (DP) matching path extending from a starting lattice point (j=1,i=1) to a final lattice point (j=J,i=I) through a plurality of lattice points.
Figure 5B:
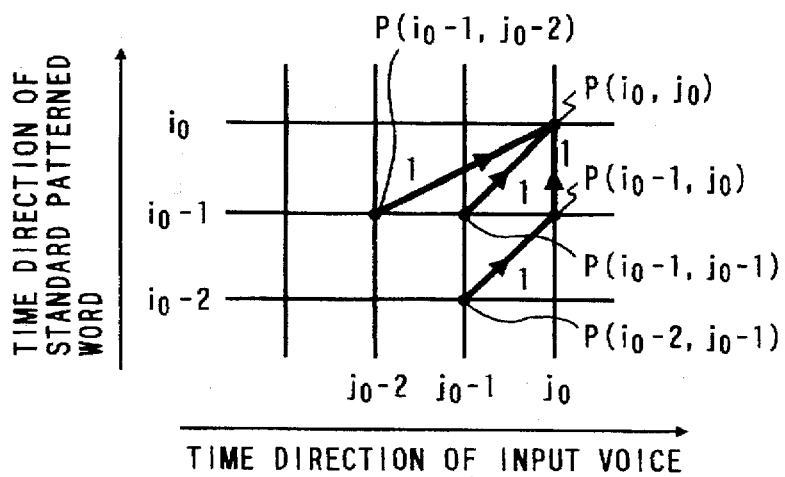
FIG. 5B shows a concept of an asymmetrical DP matching path based on a standard patterned word in which a DP matching path passes through lattice points one by one in a time direction of the standard patterned word.

Here $X\hat{i},\hat{j}$ denotes a similarity at a lattice point $(\hat{i},\hat{j})$ on the optimum DP matching path shown in FIG. 5A.

The optimum DP matching path is obtained in the DP matching unit 83 according to the continuous DP matching in which a recurrence formula (18) is utilized while using a posterior-probability similarity $l_P(i,j)$ as a distance scale according to an equation (17).

$$l_P(i,j)=\log_e\{P(X\hat{i},\hat{j}|K)/P(X\hat{i},\hat{j})\} \quad (17)$$

$$g(i,j)=\max\{g(i-1,j-2)+l_P(i,j),\ g(i-1,j-1)+l_P(i,j),g(i-2,j-1)+l_P(i-1,j)+l_P(i,j)\} \quad (18)$$

In cases where a length of the standard patterned word is equivalent to I frames and a length of the input voice is equivalent to J frames, the word similarity S is equal to a final accumulated similarity $g(I,j)=g(I,J)$ at a frame position $j=J$ at which the final accumulated similarity $g(I,j)$ is maximized.

$$S = \max_j \{g(I,j)\} \quad (19)$$
$$= g(I,J)$$

The word similarity S is calculated for each of standard patterned words to be collated with the input voice.

Thereafter, a word maximizing the word similarity S is output from the word similarity calculating unit 34 as a recognized word.

Because the posterior-probability similarity $l_P(i,j)$ has a positive value in cases where the input voice matches with a correct standard patterned word and because the posterior-probability similarity $l_P(i,j)$ has a negative value in cases where the input voice matches with a false standard patterned word, the word similarity S becomes larger as the word similarity S is accumulated on condition that the input voice matches with a correct standard patterned word. Therefore, a first accumulated value of the word similarity S in the voice recognition for a long word is larger than a second accumulated value of the word similarity S in the voice recognition for a short word.

Accordingly, a long word existing in the input voice is advantageously recognized more than a short word. That is, even though a pseudo-word similar to a short word exists in a long word of the input voice, there is no probability that the pseudo-word is erroneously recognized as the short word because the accumulated value of the word similarity S for the long word is necessarily larger than that of the word similarity S for the pseudo-word.

Also, in cases where a pseudo-word of the input voice composed of a fore word and undesired false-word following the fore word matches with a standard patterned word stored in the storing unit 22, an accumulated value of the word similarity S is gradually decreased after the word similarity S reaches a maximum value at an end position of the fore word. Therefore, there is no probability that the word similarity S reaches a high value even though a long word having an unnecessary length in the input voice matches with a standard patterned word. In other words, there is no probability that a long word having an unnecessary length is recognized as a correct word in the voice recognizing apparatus 31.

Next, a method for obtaining a value of the posterior-probability similarity $l_P(i,j)$ from the inter-frame similarity X (a sum of correlation cosines) between the time series of input voice parameters and the time series of standard patterned voice pieces denoting a standard patterned word is described.

The occurrence probability P(X|K) and the occurrence probability P(X) can be statistically obtained from a frequency distribution (in other words, a probability density function) of pieces of actual voice data. In detail, pieces of voice data are produced from 100 place names vocalized by fifty specified persons, and the voice data are input to the voice recognizing apparatus 31 as a plurality of input voices. Thereafter, the DP matching is performed in the DP matching unit 33 to match the voice data to the standard patterned words stored in the storing unit 22. Thereafter, the frequency distributions denoting the occurrence probability P(X|K) and P(X) of the inter-frame similarity X are obtained.

Figure 7A:
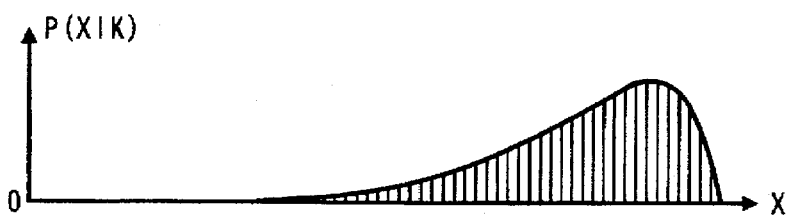
FIG. 7A shows a probability density function of a occurrence probability P(X|K) indicating an occurrence frequency distribution of an inter-frame similarity X on a correct matching path of a correct word.
Figure 7B:
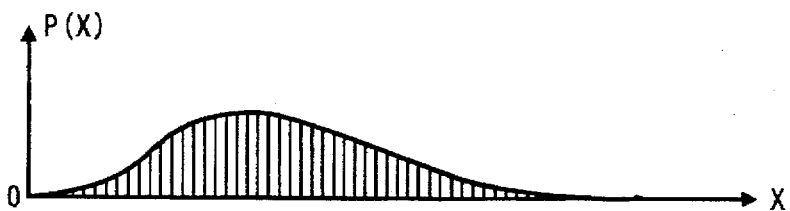
FIG. 7B shows a probability density function of a occurrence probability P(X) indicating an occurrence frequency distribution of the inter-frame similarity X between voice data including the referential voices and noises and all of standard patterned voice pieces.

FIG. 7A shows a probability density function of the occurrence probability P(X|K) indicating an occurrence frequency distribution of the inter-frame similarity X on a correct matching path of a correct word. FIG. 7B shows a probability density function of the occurrence probability P(X) indicating an occurrence frequency distribution of the inter-frame similarity X between the voice data including the referential voices and noises and all of the standard patterned voice pieces. Each of the occurrence frequency distributions shown in FIGS. 7A and 7B is normalized to set an area of the occurrence frequency distribution to a unity.

Figure 7C:
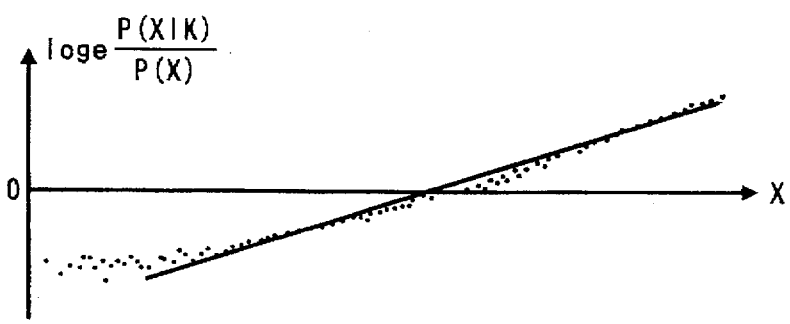
FIG. 7C shows a relationship between the inter-frame similarity X and a logarithmic ratio of the occurrence probability P(X|K) and the occurrence probability P(X) shown in FIGS. 7A and 7B.

FIG. 7C shows a relationship between the inter-frame similarity X and a logarithmic ratio of the occurrence probability P(X|K) and the occurrence probability P(X) shown in FIGS.

7A and 7B. As shown in FIG. 7C, the logarithmic ratio $\log_e\{P(X|K)/P(X)\}$ linearly varies to the inter-frame similarity X. Therefore, the posterior-probability similarity $l_P(i,j)$ can be approximately expressed according to an equation (20).

$$l_P(i,j) = \log_e\{P(\hat{X}\hat{i},\hat{j}|K)/P(\hat{X}\hat{i},\hat{j})\} \qquad (20)$$
$$= \beta(X - \alpha)$$

Here, the symbols $\alpha, \beta$ are respectively a positive constant. When the equation (20) is substituted into the equation (16), the word similarity S is expressed according to an equation (21).

$$S = \sum_{(i,j)} \beta(\hat{Xi,j} - \alpha) \qquad (21)$$
$$= \beta \sum_{(i,j)} (\hat{Xi,j} - \alpha)$$

Here $\hat{Xi,j}$ denotes a similarity at a lattice point on the optimum DP matching path.

By referring the equation (21), a high and low relationship of the word similarities S for words has no connection with the constant B. Therefore, the posterior-probability similarity $l_P(i,j)$ defined according to an equation (22) can be utilized, and the word similarities S defined according to an equation (23) can be utilized.

$$l_P(i,j) = \hat{Xi,j} - \alpha \qquad (22)$$

$$S = \sum_{(i,j)} (\hat{Xi,j} - \alpha) \qquad (23)$$

A constant a is determined according to a relationship between the logarithmic ratio $\log_e\{P(X|K)/P(X)\}$ and the inter-frame similarity X experimentally obtained, as shown in FIG. 7C.

Because the inter-frame similarity X is a sum of a first correlation cosine of the normalized similarity vectors $\hat{aj}, \hat{bi}$ formulated according to the equations (5) and (6) and a second correlation cosine of the normalized regression coefficient vectors $\hat{cj}, \hat{di}$ formulated according to the equations (7) and (8) the inter-frame similarity $\hat{Xi,j}$ can be expressed according to the equation (24) in the same manner as that expressed according to the equation (10).

$$\hat{Xi,j} = w1 \, \hat{aj} \cdot \hat{bi} + w2 \hat{cj} \cdot \hat{di} \qquad (24)$$
$$(w1 + w2 = 1, 0 \leq w1, w2 \leq 1)$$

The symbol w1 denotes a weighting factor for a mix of the phoneme similarities and the standard phoneme similarities, and the symbol w2 denotes a weighting factor for a mix of the regression coefficients and the standard regression coefficients.

When the equation (24) is substituted into the equation (22), the posterior-probability similarity $l_P(i,j)$ is expressed according to the equation (25).

$$l_P(i,j) = w1 \, \hat{aj} \cdot \hat{bi} + w2 \, \hat{cj} \cdot \hat{di} - \alpha \qquad (25)$$
$$(w1 + w2 = 1, 0 \leq w1, w2 \leq 1)$$

When the equation (24) is substituted into the equation (23), the word similarities S is expressed according to the equation (26).

$$S = \sum_{i=1}^{I} (w1 \, \hat{aj} \cdot \hat{bi} + w2 \, \hat{cj} \cdot \hat{di} - \alpha) \qquad (26)$$

Also, in cases where a DP matching path based on a standard patterned word direction is utilized, the optimum DP matching path passes through all of frames (the number of frames is I) of each of the standard patterned words once frame by frame. Therefore, the equation (26) can be rewritten to an equation (27).

$$S = \sum_{i=1}^{I} (w1 \, \hat{aj} \cdot \hat{bi} + w2 \, \hat{cj} \cdot \hat{di}) - I\alpha \qquad (27)$$

Here $\hat{Xi,j}$ denotes a similarity at a lattice point on the optimum DP matching path.

To obtain the word similarities S, after a first term at the right side of the equation (27) is calculated, a constant $I\alpha$ is merely subtracted from the first term. Therefore, a calculation volume can be reduced as compared with that required in the equation (26).

As is described above, the posterior-probability similarity $l_P(i,j)$ defined as the posterior probability of the inter-frame similarity $l_P$ is utilized in the present invention in place of the inter-frame similarity $l_P$, and the posterior-probability similarity $l_P(i,j)$ can be obtained according to a linear approximation.

Also, the posterior-probability similarity $l_P(i,j)$ has a positive value in cases where the input voice matches with a correct standard patterned word, and the posterior-probability similarity $l_P(i,j)$ has a negative value in cases where the input voice matches with a false standard patterned word. Therefore, the word similarity S defined as a sum of the posterior-probability similarities $l_P(i,j)$ at lattice points on the optimum DP matching path become larger as the word similarity S is accumulated on condition that the input voice matches with a correct standard patterned word, so that a long word existing in the input voice can be advantageously recognized more than a short word. That is, even though a pseudo-word similar to a short word exists in a long word of the input voice, there is no probability that the pseudo-word is erroneously recognized as the short word because the accumulated value of the word similarity S for the long word is necessarily larger than that of the word similarity S for the pseudo-word.

Also, in cases where a pseudo-word of the input voice composed of a fore word and undesired false-word following the fore word matches with a standard patterned word stored in the storing unit 22, an accumulated value of the word similarity S is gradually decreased after the word similarity S reaches a maximum value at an end position of the fore word. Therefore, there is no probability that the word similarity S reaches a high value even though a long word having an unnecessary length in the input voice matches with a standard patterned word. In other words, there is no probability that a long word having an unnecessary length is recognized as a correct word in the voice recognizing apparatus 31.

Accordingly, even though a plurality of words are included in the input voice in series, each of the words are reliably picked up from the input voice, and each of the words picked up can be reliably matched to a correct standard patterned word to separately recognize the words.

For example, hundred place names vocalized by fifty specified persons are sampled at 8 kHz frequency while adding noises, and pieces of voice data are produced. Thereafter, an input voice in which a plurality of words including noises are arranged in series is produced from the voice data and is input to the voice recognizing apparatus 11 and the voice recognizing apparatus 31 to compare a correct voice recognition ratio in the voice recognizing method according to the present invention and that in the conventional voice recognizing method. As a result, a correct voice recognition ratio is 87.94% in the conventional voice recognizing method. In contrast, a correct voice recognition ratio is 92.28% in the voice recognizing method according to the present invention. Therefore, more than 4% is improved by performing the voice recognizing method according to the present invention.

Next, a second embodiment according to the present invention is described with reference to FIG. 8. In the second embodiment, a differential voice power is additionally utilized as a distance scale in the continuous DP matching operation. An effect obtained by additionally utilizing the differential voice power is described as follows.

A voice power is generally low in a non-voice period and is high at a voice period. In particular, a voice power of a vowel or a nasal is very high. Also, in case of voiceless bursting phonemes /p/, /t/ and /k/ and a voiceless affricate /c/, a voice power is considerably lowered just before a burst, and a voice power is rapidly increased after the burst. Therefore, as is well-known, a voice power is useful for recognizing a voice. However, a voice power of a voice uttered by a person differ from that uttered by another person. Therefore, a differential voice power defined by differentiating a voice power with respect to time is additionally utilized as a distance scale in the continuous DP matching operation. That is, a differential voice power is rapidly increased at a starting point of the voice period in the input voice, and a differential voice power is rapidly decreased at an ending point of the voice period in the input voice. Therefore, even though a plurality of words or noises are included in the input voice, a word can be reliably picked up from the input voice.

Figure 8:
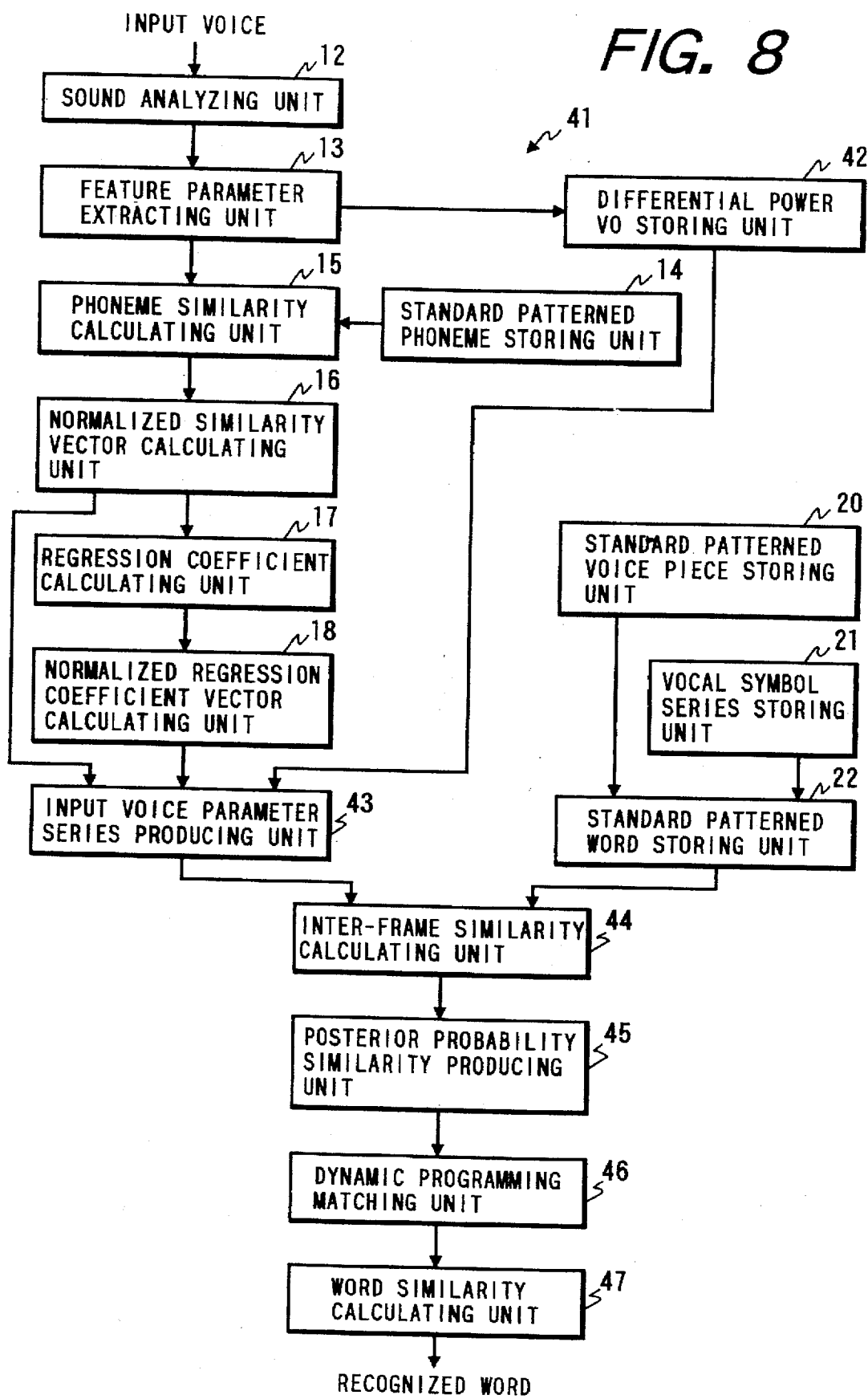
FIG. 8 is a block diagram of a voice recognizing apparatus in which an input voice is recognized according to a voice recognizing method of a second embodiment.

FIG. 8 is a block diagram of a voice recognizing apparatus in which an input voice is recognized according to a voice recognizing method of a second embodiment.

As shown in FIG. 8, a voice recognition apparatus 41 comprises the sound analyzing unit 12, the feature parameter extracting unit 13, the standard patterned phoneme storing unit 14, the phoneme similarity calculating unit 15, the normalized similarity vector calculating unit 16, the regression coefficient calculating unit 17, the normalized regression coefficient vector calculating unit 18, a differential power V0 storing unit 42 for storing a differential power V0 obtained as a feature parameter of the input voice for each of frames in the feature parameter extracting unit 18, an input voice parameter series producing unit 48 for rearranging a time series of normalized similarity vectors calculated in the calculating unit 18, a time series of normalized regression coefficient vectors calculated in the calculating unit 18 and a time series of differential powers V0 stored in the differential power V0 storing unit 42 as a time series of input voice parameters, the standard patterned voice piece storing unit 20, the pronunciation symbol series storing unit 21, the standard patterned word storing unit 22, an inter-frame similarity calculating unit 44 for calculating an inter-frame similarity lv between a time series of input voice parameters (the time series of normalized similarity vectors, the time series of normalized regression coefficient vectors and the time series of differential powers V0) produced in the producing unit 43 and the time series of standard parameters stored in the storing unit 22, a posterior probability similarity producing unit 45 for producing a posterior-probability similarity lvp from the inter-frame similarity lv calculated in the calculating unit 44, a DP matching unit 46 for performing a continuous dynamic programming (DP) matching operation to obtain an accumulated similarity g(i,j) from the posterior-probability similarity lvp calculated in the producing unit 45 for each of the standard patterned words stored in the storing unit 22, and a word similarity calculating unit 47 for calculating a final accumulated similarity from the accumulated similarity obtained in the matching unit 46 for each of the standard patterned words stored in the storing unit 22, obtaining a word similarity S=g(I,J) for each of the standard patterned words, selecting a particular word similarity for a particular standard patterned word having a maximum value from among the word similarities S, and outputting the particular standard patterned word as a recognized word.

In the above configuration, the time series of normalized similarity vectors is calculated in the calculating unit 16, and the time series of normalized regression coefficient vectors is calculated in the calculating unit 18 in the same manner. Also, the differential power V0 obtained as a feature parameter of the input voice for each of frames in the feature parameter extracting unit 13 is stored in the differential power V0 storing unit 42. Thereafter, the time series of normalized similarity vectors, the time series of normalized regression coefficient vectors and a time series of differential powers V0 stored in the differential power V0 storing unit 42 are rearranged as a time series of input voice parameters in the input voice parameter series producing unit 43.

Also, a small number of specified persons vocalize a set of words determined by considering phonemic circumstances, and referential voices of the specified persons are analyzed to obtain pieces of voice data for producing a plurality of types of standard patterned voice pieces. Thereafter, an averaged value µ and a variance σ of standard differential powers are calculated by performing the DP matching of a plurality of standard patterned pieces belonging to the same standard patterned voice piece type while time-matching the standard patterned pieces and are stored for each of frames of the voice piece types in the storing unit 20. Thereafter, the averaged value µ and a variance σ of the standard differential powers are stored for each of frames of a standard patterned word and for each of the standard patterned words.

Thereafter, in the inter-frame similarity calculating unit 44, the time series of input voice parameters stored in the producing unit 19 is collated with a time series of standard patterned voice pieces composing a standard patterned word stored in the storing unit 22 to calculate an inter-frame similarity lv. The inter-frame similarity lv is defined as a weighted sum of a first similarity between the time series of normalized similarity vectors and the time series of standard normalized similarity vectors, a second similarity between the time series of normalized regression coefficient vectors and the time series of standard normalized regression coefficient vectors and a third similarity between the time series of differential powers and a time series of standard differential powers. In detail, in cases where a similarity between a differential power at a j-th frame of the input voice and a standard differential power at an i-th frame of a standard patterned word is expressed by dv(i,j), an inter-frame similarity lv(i,j) is expressed according to an equation (28).

$$lv(i,j) = w1 \; a_j \cdot b_i + w2 \; c_j \cdot d_i + w3 * dv(i,j) \quad (28)$$
$$(w1 + w2 + w3 = 1, 0 \leq w1, w2, w3 \geq 1)$$

As a distance scale of the differential power, the Euclidean distance, the weighted Euclidean distance or a Maharanobis' distance is utilized. In this embodiment, a posterior-probability Maharanobis' distance is utilized. In this case, the similarity dv(i,j) between a differential power at a j-th frame of the input voice and a standard differential power at an i-th frame of a standard patterned word is expressed according to an equation (29).

$$dv(i,j) = -\{(\mu_j - v_j)^2/(2\sigma_j^2)\} + \{(\mu_x - v_j)^2/(2\sigma_x^2)\} - \log_e \sigma_j + \log_e \sigma_x \quad (29)$$

Here the symbol $\mu_i$ denotes an averaged differential power of differential powers at an i-th frame of a standard patterned word, the symbol $\sigma_i$ denotes a variance of the differential powers at the i-th frame of the standard patterned word, the symbol $\mu_x$ denotes an averaged differential power of differential powers at all frames of the standard patterned word, the symbol $\sigma_x$ denotes a variance of the differential powers at all frames of the standard patterned word, and the symbol $v_j$ denotes a differential power at a j-th frame of the input voice.

Thereafter, a posterior-probability similarity lvp(i,j) is produced from the inter-frame similarity lv(i,j) according to an equation (30) in the posterior probability similarity producing unit 45, in the same manner as the posterior-probability similarity lp(i,j) in the first embodiment.

$$lvp(i,j) = w1\ a_j \cdot b_i + w2\ c_j \cdot d_i + w3*dv(i,j) - \alpha \quad (30)$$
$$(w1 + w2 + w3 = 1, 0 \leq w1, w2, w3 \leq 1)$$

A constant $\alpha$ is determined according to a relationship between the logarithmic ratio $\log_e\{P(X|K)/P(X)\}$ and the inter-frame similarity X experimentally obtained.

Thereafter, a continuous DP matching operation is performed in the DP matching unit 46 to obtain an accumulated similarity g(i,j) according to a recurrence formula (31) while using the posterior-probability similarity lvp(i,j) as a distance scale.

$$g(i,j)=\max\{g(i-2,j-1)+lvp(i,j), g(i-1,j-1)+lvp(i,j), g(i-1,j-2)+lvp(i,j-1)+lvp(i,j)\} \quad (31)$$

Thereafter, in the word similarity calculating unit 47, a word similarity S=g(I,J) is obtained for each of the standard patterned words, and a recognized word is output in the same manner as in the word similarity calculating unit 25.

Accordingly, because a differential power is utilized for the matching of the input voice to each of the standard patterned words, the voice matching according to the second embodiment can be performed with a high accuracy.

Also, a word existing in the input voice can be taken out with a high accuracy.

For example, hundred place names vocalized by fifty specified persons are sampled at 8 kHz frequency while adding noises, and pieces of voice data are produced. Thereafter, an input voice in which a plurality of words including noises are arranged in series is produced from the voice data and is input to the voice recognizing apparatus 11 and the voice recognizing apparatus 41 to compare a correct voice recognition ratio in the voice recognizing method according to the present invention and that in the conventional voice recognizing method. As a result, a correct voice recognition ratio is 87.94% in the conventional voice recognizing method. In contrast, a correct voice recognition ratio is 93.88% in the voice recognizing method according to second embodiment of the present invention. Therefore, more than 5% is improved by performing the voice recognizing method according to the present invention, and the improvement of 1.6% is obtained as compared with the first embodiment.

In the second embodiment, the inter-frame similarity lv(i,j) is changed to the posterior-probability similarity lvp(i,j) in the posterior probability similarity producing unit 45. However, it is applicable that the inter-frame similarity lv(i,j) be processed in the DP matching unit 24 and the normalized word similarity calculating unit 25 in the same manner as in the conventional voice recognizing apparatus 11.

Next, a third embodiment according to the present invention is described with reference to FIG. 9.

Figure 9:
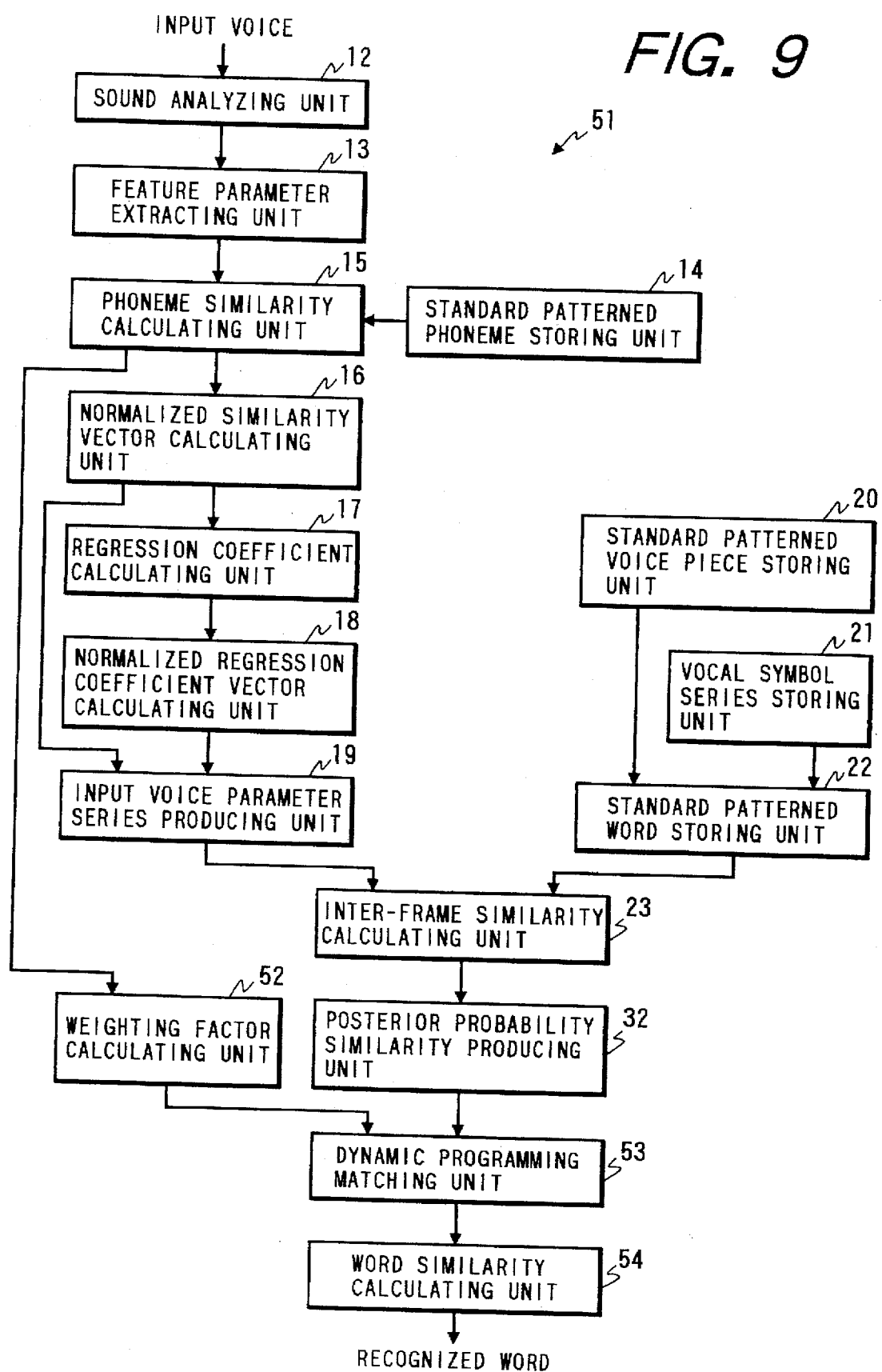
FIG. 9 is a block diagram of a voice recognizing apparatus in which an input voice is recognized according to a voice recognizing method of a third embodiment.

FIG. 9 is a block diagram of a voice recognizing apparatus in which an input voice is recognized according to a voice recognizing method of a third embodiment.

As shown in FIG. 9, a voice recognition apparatus 51 comprises the sound analyzing unit 12, the feature parameter extracting unit 13, the standard patterned phoneme storing unit 14, the phoneme similarity calculating unit 15, the normalized similarity vector calculating unit 16, the regression coefficient calculating unit 17, the normalized regression coefficient vector calculating unit 18, the input voice parameter series producing unit 19, the standard patterned voice piece storing unit 20, the pronunciation symbol series storing unit 21, the standard patterned word storing unit 22, the inter-frame similarity calculating unit 23, the posterior probability similarity producing unit 32, a weighting factor calculating unit 52 for calculating a weighting factor q, on the basis of a maximum phoneme similarity having a maximum value among the phoneme similarities of a frame calculated in the calculating unit 15, for each of frames, a DP matching unit 53 for modifying the posterior-probability similarity lp produced in the producing unit 32 into a weighted posterior-probability similarity lpq by multiplying the posterior-probability similarity lp by the weighting factor calculated in the calculating unit 52 and performing a continuous dynamic programming (DP) matching operation to obtain an accumulated similarity g(i,j) from the weighted posterior-probability similarity lpq for each of the standard patterned words stored in the storing unit 22, and a word similarity calculating unit 54 for calculating a final accumulated similarity from the accumulated similarity obtained in the matching unit 53 for each of the standard patterned words stored in the storing unit 22, obtaining a word similarity S=g(I,J) for each of the standard patterned words, selecting a particular word similarity for a particular standard patterned word having a maximum value from among the word similarities S, and outputting the particular standard patterned word as a recognized word.

In the above configuration, the posterior-probability similarity lp(i,j) formulated according to the equation (25) is calculated according to a voice recognizing method of the second embodiment in the same manner as the voice recognizing method of the first embodiment. Also, a weighting factor q is calculated on the basis of a maximum phoneme similarity having a maximum value among the phoneme similarities of a frame in the weighting factor calculating unit 52. The reason that the weighting factor q is utilized is as follows.

Each of phoneme similarities at undesired frames relating to noises included in the input voice has a small value when the phoneme similarities are calculated in the calculating unit 15 because the noises are not similar to any of the twenty types standard patterned phonemes. In the first and second embodiment, because the similarity vectors are normalized in the calculating unit 16, values of the phoneme similarities at the undesired frames are undesirably increased t be almost the same as those at vocal frames not relating to the noises. In the third embodiment, the posterior-probability similarity lp(i,j) obtained in the producing unit 32 is weighted by the weighting factor q for each of frames to emphasize the posterior-probability similarities lp(i,j) at the vocal frames and to deemphasize the posterior-probability similarities lp(i,j) at the undesired frames.

In detail, a maximum phoneme similarity having a maximum value is selected from among the phoneme similarities of a frame for each of frames, and the maximum phoneme similarities are smoothed in a time direction to be approximated by a curved line. Thereafter, the maximum phoneme similarity S(j) placed on the curved line at a j-th frame is determined. The maximum phoneme similarity S(j) is expressed according to an equation (32).

$$S(j) = \left\{ \sum_{\substack{k=-n \\ (n=3)}}^{n} \left\{ \max_{p=1}^{20} \{a(p,j+k)\} \right\} \right\} / (2n+1) \quad (32)$$

Here the symbol a(p,j+k) denotes a phoneme similarity of a p-th type standard patterned phoneme at a (j+k)-th frame. The maximum phoneme similarity S(j) is utilized as a criterion whether or not the input voice at the j-th frame is similar to a voice. Therefore, the probability that the input voice at the j-th frame is a voice is heightened as the value of the maximum phoneme similarity S(j) is increased. The weighting factor q(j) for the input voice at the j-th frame is defined in the third embodiment according to an equation (33).

$$q(j) = \begin{cases} 1 & (S(j) > 0) \\ 1 + \gamma(1-m)S(j) & (0 \geq S(j) \geq -1/\gamma) \\ m & (S(j) < -1/\gamma) \end{cases} \quad (33)$$

The parameters $\gamma$ and m are determined according to pieces of voice data experimentally obtained from referential voices of a small number of specified persons. In cases where S(j)>0 is satisfied, the input voice at the j-th frame indicates a portion of word, and the weighting factor q(j) is set to 1. In cases where S(j)<-1/$\gamma$ is satisfied, the input voice at the j-th frame indicates a noise, and the weighting factor q(j) is set to m (0<m<1). In cases where 0≧S(j)≧-1/$\gamma$ is satisfied, whether the input voice at the j-th frame is a portion of word is unknown, and the weighting factor q(j) is set to 1+$\gamma$(1-m)S(j).

Thereafter, in the DP matching unit 53, the posterior-probability similarity lp obtained in the posterior probability similarity producing unit 32 is multiplied by the weighting factor q(j) to modify the posterior-probability similarity lp(i,j) into a weighted posterior-probability similarity lpq(i,j) as is expressed according to an equation (34).

$$lpq(i,j) = q(j)^* \{w1 \; a_j \cdot b_i + w2 \; c_j \cdot d_i - \alpha\} \quad (34)$$
$$(w1 + w2 = 1, 0 \leq w1, w2 \leq 1)$$

Thereafter, a continuous dynamic programming (DP) matching operation is performed to obtain an accumulated similarity g(i,j) according to a recurrence formula (35) while using the weighted posterior-probability similarity lpq(i,j) as a distance scale.

$$g(i,j)=\max\{g(i-1,j-2)+lpq(i,j), g(i-1,j-1)+lpq(i,j), g(i-2,j-1)+lpq(i-1,j)+lpq(i,j)\} \quad (35)$$

Thereafter, in the word similarity calculating unit 54, a word similarity S=g(I,J) is obtained for each of the standard patterned words, and a recognized word is output in the same manner as in the word similarity calculating unit 25 of the first embodiment.

Accordingly, because the posterior-probability similarities lp(i,j) produced from the inter-frame similarities l(i,j) between the input voice and a standard patterned word are weighted with the weighting factor q(j), the weighted posterior-probability similarities lpq(i,j) produced from the inter-frame similarities l(i,j) between the input voice at undesired frames relating to noises and a standard patterned word are necessarily reduced. Therefore, the undesired frames relating to noises can be recognized with a high accuracy. That is, even though noises are undesirably included in the input voice indicating a series of words, each of the words can be reliably picked up from the input voice to recognize the input voice.

Also, because the weighting factor q(j) is defined on the basis of the phoneme similarities at the i-th frame, the voice recognizing performance according to the voice recognizing method of the third embodiment is not adversely influenced by the variation of spectrum characteristics of the noises.

For example, hundred place names vocalized by fifty specified persons are sampled at 8 kHz frequency while adding noises, and pieces of voice data are produced. Thereafter, an input voice in which a plurality of words including noises are arranged in series is produced from the voice data and is input to the voice recognizing apparatus 11 and the voice recognizing apparatus 51 to compare a correct voice recognition ratio in the voice recognizing method according to the present invention and that in the conventional voice recognizing method. As a result, a correct voice recognition ratio is 87.94% in the conventional voice recognizing method. In contrast, a correct voice recognition ratio is 93.74% in the voice recognizing method according to third embodiment of the present invention. Therefore, more than 5% is improved by performing the voice recognizing method according to the present invention, and the improvement of 1.5% is obtained as compared with the first embodiment.

In the third embodiment, the weighting factor is obtained from the phoneme similarities. However, it is applicable that a weighting factor weighted to the inter-frame similarity be obtained from voice powers of the input voice. In this case, the weighting factor can be obtained from the combination of a total band voice power, a high band voice power, a middle band voice power and a low band voice power.

Next, a fourth embodiment according to the present invention is described with reference to FIG. 10.

Figure 10:
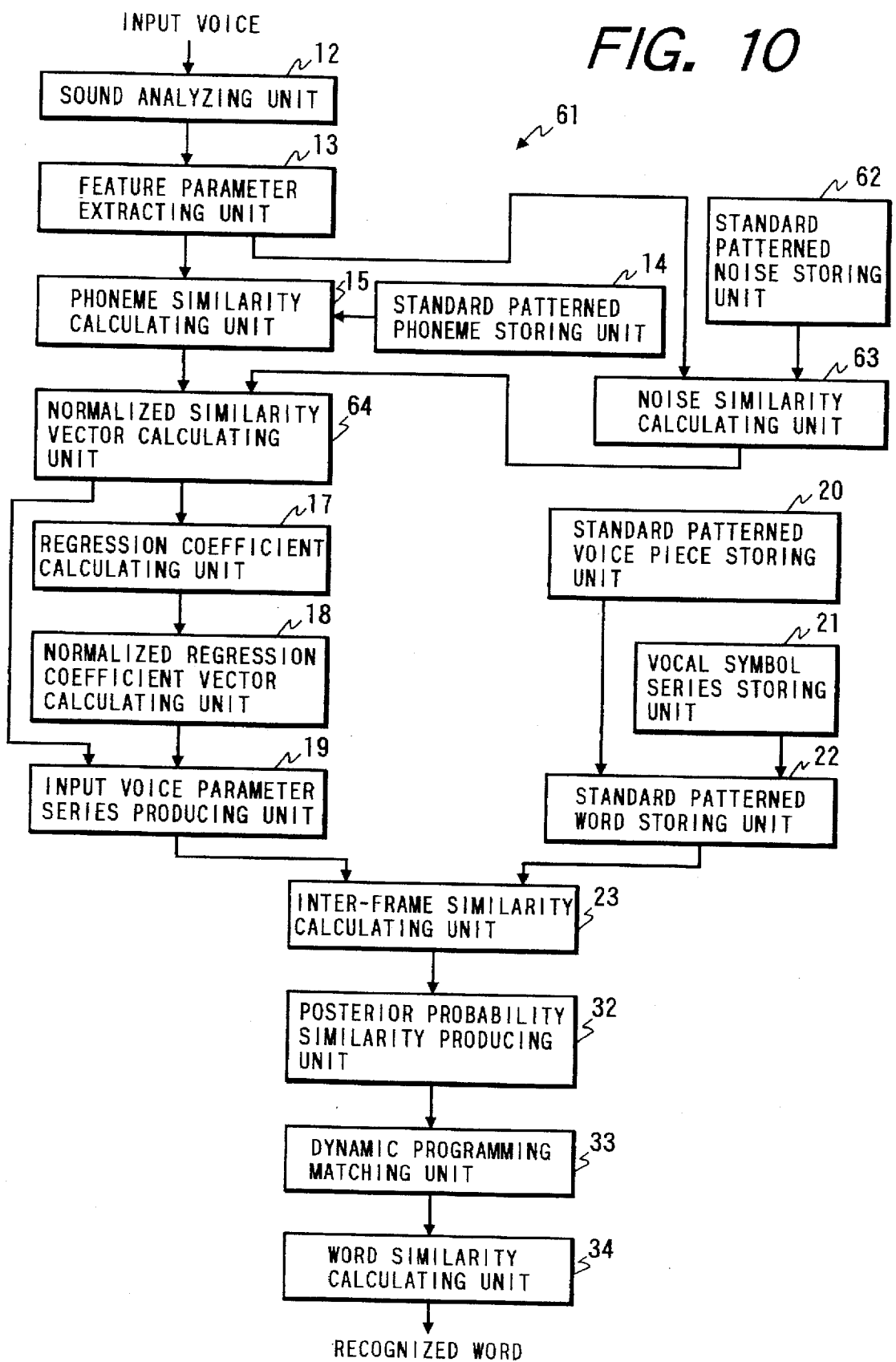
FIG. 10 is a block diagram of a voice recognizing apparatus in which an input voice is recognized according to a voice recognizing method of a fourth embodiment.

FIG. 10 is a block diagram of a voice recognizing apparatus in which an input voice is recognized according to a voice recognizing method of a fourth embodiment.

As shown in FIG. 10, a voice recognition apparatus 61 comprises the sound analyzing unit 12, the feature parameter extracting unit 13, the standard patterned phoneme storing unit 14, the phoneme similarity calculating unit 15, a standard patterned noise storing unit 62 for storing a standard patterned noise obtained by analyzing a large number of noises, a noise similarity calculating unit 63 for calculating a noise similarity between the standard patterned noise stored in the storing unit 62 and each of feature parameters extracted in the extracting unit 13 for each frames, a normalized similarity vector calculating unit 64 for normalizing the similarity vectors produced in the calculating unit 15 to make a vector length of each of the similarity vectors less than a unity by considering the noise similarity calculated in the calculating unit 63 and producing a normalized similarity vector having normalized phoneme similarities for each of frames, the regression coefficient calculating unit 17, the normalized regression coefficient vector calculating unit 18, the input voice parameter series producing unit 19, the standard patterned voice piece storing unit 20, the vocal symbol series storing unit 21, the standard patterned word storing unit 22, the inter-frame similarity calculating unit 23, the posterior probability similarity producing unit 32, the DP matching unit 33, and the word similarity calculating unit 34.

In the above configuration, a standard patterned noise is prepared by utilizing a time series of feature parameters (LPC cepstrum coefficients C0 to C8 and differential voice powers V0) obtained at noise periods relating to noises, in the same manner as the standard patterned phonemes, and the standard patterned noise is stored in the standard patterned noise storing unit 62 in advance. Thereafter, a noise similarity Xn between the standard patterned noise stored in the storing unit 62 and the time series of feature parameters x of the input voice obtained in the extracting unit 13 is calculated for each of frames of the input voice in the noise similarity calculating unit 63, in the same manner as the phoneme similarities are calculated according to the equation (3) in the phoneme similarity calculating unit 15. A value of the noise similarity at each of noise frames relating to noises is high, and a value of the noise similarity at each of vocal frames not relating to noises is low.

Thereafter, a twenty-one dimensional similarity vector having twenty phoneme similarities $d_P$ pertaining to the twenty types standard patterned phonemes and the noise similarity Xn as twenty-one elements is normalized to form a twenty dimensional normalized similarity vector a having twenty normalized phoneme similarities $a_P$ as twenty elements for each of frames of the input voice according to an equation (36) in the normalized similarity vector calculating unit 64.

$$a_P = d_P/(d_1^2 + d_2^2 + \ldots + d_{20}^2 + Xn^2)^{1/2} \quad (36)$$
$$(P = 1,2,\ldots,20)$$
$$a = (a_1, a_2, \ldots, a_{20})$$

In this case, a vector length of the normalized similarity vector a is less than a unity. Because the value of the noise similarity at each of the noise frames is high, the vector length of the normalized similarity vector a at each of the noise frames becomes short. In contrast, because the value of the noise similarity at each of the vocal frames is low, the vector length of the normalized similarity vector a at each of the vocal frames becomes long and is almost equal to a unity. Therefore, because the noise similarity Xn is utilized to form the normalized similarity vector a of the input voice, the noise similarity Xn functions as a weighting factor utilized to weight the inter-frame similarity or the posterior-probability similarity.

Thereafter, a normalized regression coefficient vector is calculated for each of frames in the normalized regression coefficient vector 18, an inter-frame similarity and a posterior-probability similarity are calculated in the same manner as in the first embodiment. Thereafter, a continuous DP mating operation is performed, and a recognized word is output in the same manner as in the first embodiment.

Accordingly, because the noise similarity Xn is utilized to form the normalized similarity vector a of the input voice, the inter-frame similarities and the posterior-probability similarities at each of the noise frames of the input voice are decreased. Therefore, the noise frames relating to noises can be recognized with a high accuracy. That is, even though noises are undesirably included in the input voice indicating a series of words, each of the words can be reliably picked up from the input voice to recognize the input voice.

Also, because any weighting factor or any differential voice power is not added to the posterior-probability similarities, a calculation volume required to perform the continuous DP matching operation in the DP matching unit 33 is the same as that in the first embodiment. In other words, the calculation volume required in the DP matching unit 33 is smaller than that in the second or third embodiment.

For example, hundred place names vocalized by fifty specified persons are sampled at 8 kHz frequency while adding noises, and pieces of voice data are produced. Thereafter, an input voice in which a plurality of words including noises are arranged in series is produced from the voice data and is input to the voice recognizing apparatus 11 and the voice recognizing apparatus 61 to compare a correct voice recognition ratio in the voice recognizing method according to the present invention and that in the conventional voice recognizing method. As a result, a correct voice recognition ratio is 87.94% in the conventional voice recognizing method. In contrast, a correct voice recognition ratio is 93.48% in the voice recognizing method according to fourth embodiment of the present invention. Therefore, more than 5% is improved by performing the voice recognizing method according to the present invention, and the improvement of 1.2% is obtained as compared with the first embodiment.

Next, a fifth embodiment according to the present invention is described with reference to FIG. 11.

Figure 11:
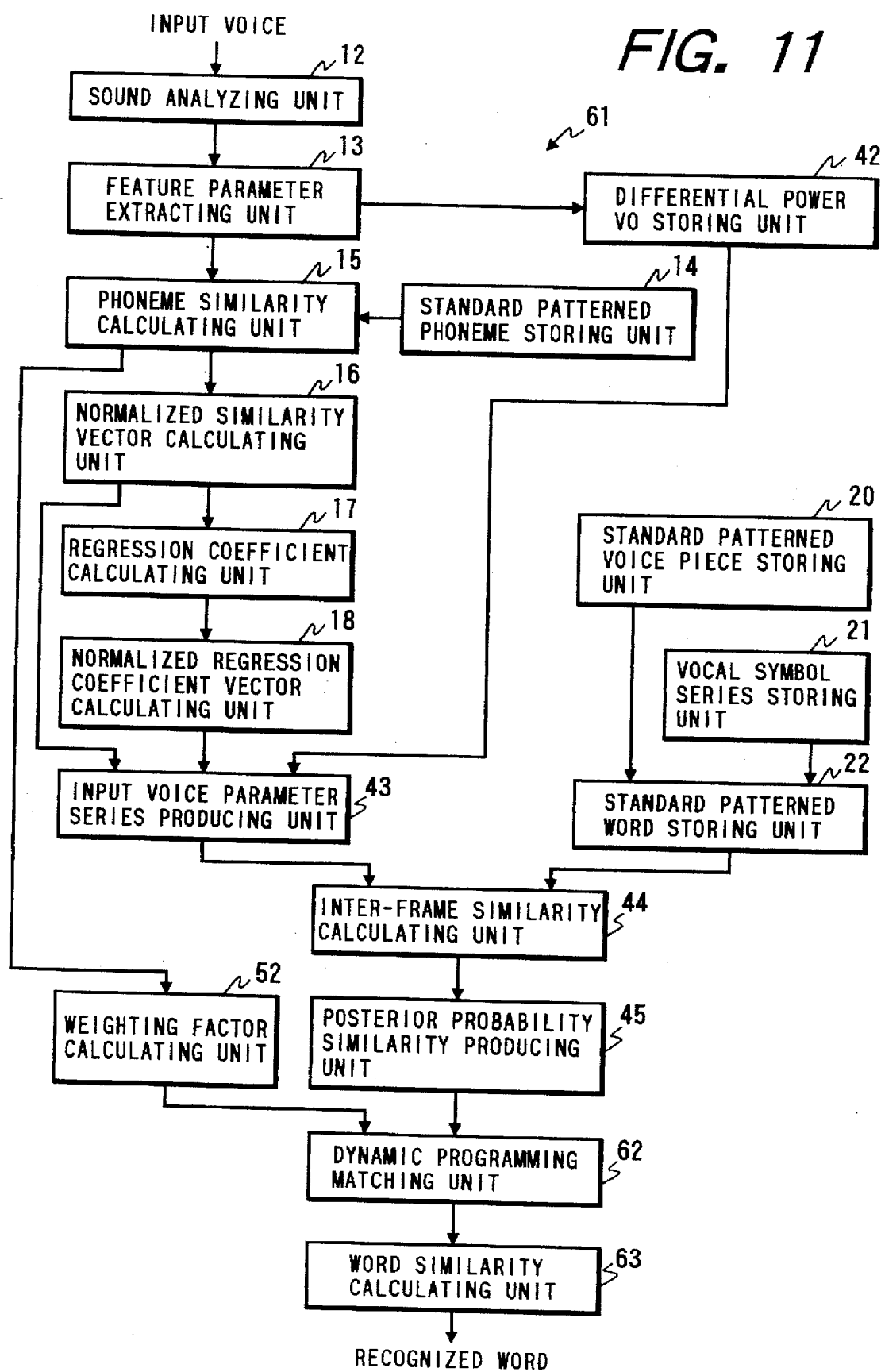
FIG. 11 is a block diagram of a voice recognizing apparatus in which an input voice is recognized according to a voice recognizing method of a fifth embodiment.

FIG. 11 is a block diagram of a voice recognizing apparatus in which an input voice is recognized according to a voice recognizing method of a fifth embodiment.

As shown in FIG. 11, a voice recognition apparatus 61 comprises the sound analyzing unit 12, the feature parameter extracting unit 13, the standard patterned phoneme storing unit 14, the phoneme similarity calculating unit 15, the normalized similarity vector calculating unit 16, the regression coefficient calculating unit 17, the normalized regression coefficient vector calculating unit 18, the differential power V0 storing unit 42, the input voice parameter series producing unit 43, the standard patterned voice piece storing unit 20, the pronunciation symbol series storing unit 21, the standard patterned word storing unit 22, the inter-frame similarity calculating unit 44, the posterior probability similarity producing unit 45, the weighting factor calculating unit 52, a DP matching unit 62 for modifying the posterior-probability similarity lvp produced in the producing unit 45 into a weighted posterior-probability similarity lvpq by multiplying the posterior-probability similarity lvp by the weighting factor q(j) calculated in the calculating unit 52 and performing a continuous dynamic programming (DP) matching operation to obtain an accumulated similarity g(i,j) from the weighted posterior-probability similarity lvpq for each of the standard patterned words stored in the storing unit 22, and a word similarity calculating unit 63 for calculating a final accumulated similarity from the accumulated similarity obtained in the matching unit 62 for each of the standard patterned words stored in the storing unit 22, obtaining a word similarity S=g(I,J) for each of the standard patterned words, selecting a particular word similarity for a particular standard patterned word having a maximum value from among the word similarities S, and outputting the particular standard patterned word as a recognized word.

In the above configuration, the posterior-probability similarity lvp is produced in the posterior probability similarity producing unit 45 in the same manner as in the second embodiment. Thereafter, in the DP matching unit 62, the posterior-probability similarity lvp is multiplied by the weighting factor q(j) obtained in the calculating unit 52 to modify the posterior-probability similarity lvp(i,j) into a weighted posterior-probability similarity lvpq(i,j) as is expressed according to an equation (37).

$$lvpq(i,j) = q(j)*\{w1a_j \cdot b_i + w2c_j \cdot d_i + w3*dv(i,j) - \alpha\} \quad (37)$$
$$(w1 + w2 + w3 = 1, 0 \leq w1, w2, w3 \leq 1)$$

Thereafter, a continuous dynamic programming (DP) matching operation is performed to obtain an accumulated similarity g(i,j) according to a recurrence formula (38) while using the weighted posterior-probability similarity lvpq(i,j) as a distance scale.

$$g(i,j) = \max\{g(i-2,j-1) + lvpq(i,j), g(i-1,j-1) + lvpq(i,j), g(i-1,j-2) +$$

$lvpq(i,j-1)+lvpq(i,j)\}$  (38)

Thereafter, in the word similarity calculating unit 63, a word similarity S=g(I,J) is obtained for each of the standard patterned words, and a recognized word is output in the same manner as in the word similarity calculating unit 25 of the first embodiment.

Accordingly, because the weighted posterior-probability similarity lvpq(i,j) is formed according to a combined inventive idea of the first, second and third embodiments, a probability that a part of a word included in the input voice undesirably matches with a false standard patterned word is considerably decreased, and a probability that a noise included in the input voice undesirably matches with a standard patterned word is considerably decreased. Therefore, a word included in the input voice can be reliably picked up from the input voice, and the word can be recognized with a high accuracy.

For example, hundred place names vocalized by fifty specified persons are sampled at 8 kHz frequency while adding noises, and pieces of voice data are produced. Thereafter, an input voice in which a plurality of words including noises are arranged in series is produced from the voice data and is input to the voice recognizing apparatus 61. As a result, a correct voice recognition ratio is 94.94% in the voice recognizing method according to fifth embodiment of the present invention. Therefore, the improvement of more than 1% is obtained as compared with the second and third embodiments.

In the first to fifth embodiments, the DP matching path according to the concept of the asymmetrical DP matching path shown in FIG. 5B is adopted. Because the final accumulated similarity is normalized according to the equation (12) by dividing the final accumulated similarity by the frame number I of the standard patterned word in the prior art, it is necessary to adopt the concept of the asymmetrical DP matching path shown in FIG. 5B which is based on the standard patterned word. However, in the first to fifth embodiments according to the present invention, the posterior-probability similarities are accumulated to obtain the word similarity without any normalization. Therefore, it is not required to adopt the concept of the asymmetrical DP matching path shown in FIG. 5B. Also, a path weighting factor with which each of the posterior-probability similarities accumulated at the lattice points on the optimum DP matching path is weighted can be arbitrarily set.

Figure 12:
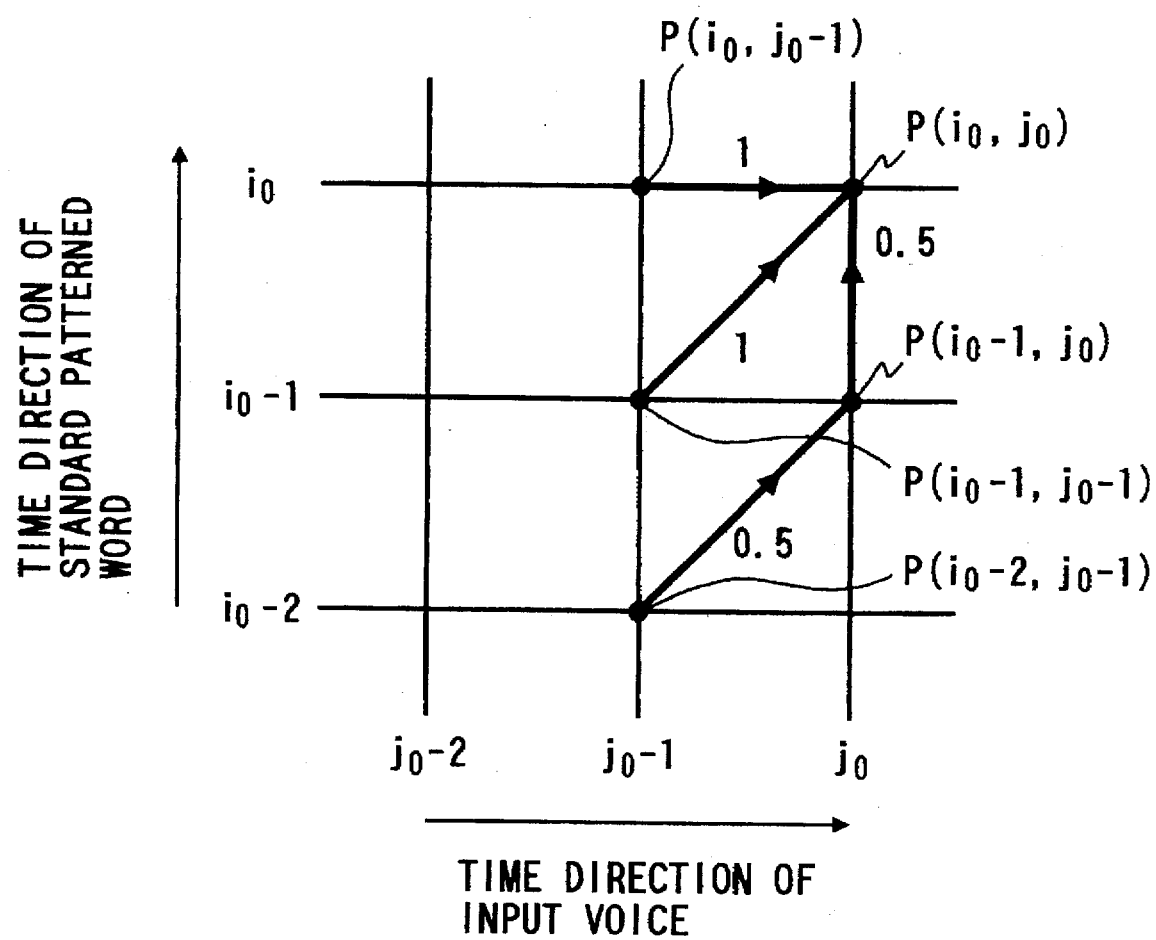
FIG. 12 shows a concept of another asymmetrical DP matching path based on an input voice in which a DP matching path passes through lattice points one by one in a time direction of the input voice.

As shown in FIG. 12, a concept of another asymmetrical DP matching path based on an input voice in which a DP matching path passes through lattice points one by one in a time direction of the input voice can be useful. In detail, three paths reaching a lattice point $P(i_o,j_o)$ are defined. A first path extends from a lattice point $P(i_o,j_o-1)$ to the lattice point $P(i_o,j_o)$, a second path extends from a lattice point $P(i_o-1,j_o-1)$ to the lattice point $P(i_o,j_o)$, and a third path extends from a lattice point $P(i_o-2,j_o-1)$ to the lattice point $P(i_o,j_o)$ through a lattice point $P(i_o-1,j_o)$. Also, a weighting factor of 0.5 with which the posterior-probability similarities $l_P(i_o-1,j_o)$ and $l_P(i_o,j_o)$ allocated at the lattice points $P(i_o-1,j_o)$ and $P(i_o,j_o)$ are weighted when the third path is selected. Because two posterior-probability similarities $l_P(i_o-1,j_o)$ and $l_P(i_o,j_o)$ are accumulated while passing from the frame $j_o-1$ to the frame $j_o$ in the time direction of the input voice along the third path, the path weighting factor of 0.5 is set.

For example, in cases where the concept of the asymmetrical DP matching path based on an input voice is adopted to determine the optimum DP matching path in the fifth embodiment, the correct voice recognition ratio reaches 95.22%.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A voice recognizing method in which a word included in an input voice is recognized, comprising the steps of:

preparing a plurality of standard patterned words to be collated with the input voice, each of the standard patterned words being formed of a time series of standard patterned voice pieces;

producing a time series of input voice parameters from the input voice;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word;

subtracting a constant value from each of the inter-frame similarities respectively obtained for each analyzing time and for each standard patterned word to obtain a posterior probability similarity for each analyzing time and for each standard patterned word on condition that each of the posterior probability similarities for a correct standard patterned word agreeing with an input word uttered by the input voice has a positive value and each of the posterior probability similarities for standard patterned words other than the correct standard patterned word has a negative value;

accumulating the posterior probability similarities according to a continuous dynamic programming matching operation to obtain a word similarity for each standard patterned word, a sum of the posterior probability similarities for the correct standard patterned word being increased as the posterior probability similarities are accumulated, and a sum of the posterior probability similarities for standard patterned words other than the correct standard patterned word being decreased as the posterior probability similarities are accumulated;

selecting a maximum word similarity having a maximum value from among the word similarities defined for the standard patterned words, the maximum word similarity being obtained by accumulating the posterior probability similarities for the correct standard patterned word; and outputting the correct standard patterned word as a recognized word of the input voice.

2. A method according to claim 1 in which the step of subtracting a constant value from each of the inter-frame similarities includes:

defining a plurality of lattice points P(i,j) at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

defining the posterior probability similarity $l_P(i,j)$ as a logarithmic ratio $\log_e\{P(Xi,j|K)/P(Xi,j)\}$, $P(Xi,j|K)$ denoting an occurrence probability of the inter-frame similarity $Xi,j$ between an input voice parameter at a j-th frame of the input voice and a standard patterned voice piece at an i-th frame of the standard patterned word, and $P(Xi,j)$ denoting an occurrence probability of the inter-frame similarities $Xi,j$ at all of lattice points;

statistically obtaining a first relationship between the occurrence probability $P(Xi,j|K)$ and the inter-frame similarity $Xi,j$ according to pieces of voice data of a specified person;

statistically obtaining a second relationship between the occurrence probability $P(Xi,j)$ and the inter-frame similarity $Xi,j$ according to the voice data;

determining a third relationship between the posterior probability similarity $l_P(i,j)=\log_e\{P(Xi,j|K)/P(Xi,j)\}$ and the inter-frame similarity $Xi,j$ according to the first and second relationships; and approximately determining the third relationship to the posterior probability similarity $l_P(i,j)=Xi,j-\alpha$, $\alpha$ being the constant value.

3. A method according to claim 1 in which the step of accumulating the posterior probability similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

allocating the posterior probability similarities $l_P(i,j)$ to the lattice points $P(i,j)$ in one-to-one correspondence;

determining a dynamic programming matching path extending from a starting lattice point $P(1,1)$ to a final lattice point $P(I,J)$ according to a concept of an asymmetrical dynamic programming matching path in which three paths reaching a lattice point $P(i_o,j_o)$ is representatively defined;

determining an optimum dynamic programming matching path extending from the starting lattice point $P(1,1)$ to the final lattice point $P(I,J)$ while selecting one of the three paths defined according to the concept of the asymmetrical dynamic programming matching path on condition that an accumulated value of the posterior probability similarities $l_P(i,j)$ placed on the dynamic programming matching path is maximized;

accumulating values of the posterior probability similarities $l_P(i,j)$ placed on the optimum dynamic programming matching path to obtain an accumulated value; and regarding the accumulated value as the word similarity.

4. A method according to claim 3 in which the step of determining a dynamic programming matching path includes the steps of:

setting a first path extending from a lattice point $P(i_o-1, j_o-2)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path; and setting a third type path extending from a lattice path $P(i_o-2,j_o-1)$ to the lattice point $P(i_o,j_o)$ through a lattice point $P(i_o-1,j_o)$ as one of the three paths defined according to the concept of the asymmetrical dynamic programming matching path.

5. A method according to claim 3 in which the step of determining a dynamic programming matching path includes the steps of:

setting a first path extending from a lattice point $P(i_o,j_o-1)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path;

setting a third path extending from a lattice path $P(i_o-2, j_o-1)$ to the lattice point $P(i_o,j_o)$ through a lattice point $P(i_o-1,j_o)$ as one of the three paths defined according to the concept of the asymmetrical dynamic programming matching path; and setting a path weighting factor of 0.5 with which the posterior probability similarities $l_P(i_o-1,j_o)$ and $l_P(i_o,j_o)$ allocated at the lattice points $P(i_o-1,j_o)$ and $P(i_o,j_o)$ along the third path is weighted.

6. A voice recognizing method in which a word included in an input voice is recognized, comprising the steps of:

preparing a plurality of standard patterned phonemes;

extracting a group of standard feature parameters from pieces of voice data obtained from voices of a small number of specified persons for each analyzing time, a standard differential voice power defined by differentiating a standard voice power with respect to time being included in the group of standard feature parameters;

calculating a standard phoneme similarity between the group of standard feature parameters and one of the standard patterned phonemes for each analyzing time and for each standard patterned phoneme;

preparing a standard similarity vector having the standard phoneme similarities at the same analyzing time for each analyzing time;

preparing a standard regression coefficient vector from the standard phoneme similarities for each analyzing time;

producing a plurality of standard patterned words to be collated with the input voice according to the standard phoneme similarities, each of the standard patterned words being formed of a time series of standard patterned voice pieces, and each of the standard patterned voice pieces being composed of the standard phoneme similarities for the standard patterned phonemes;

extracting a group of feature parameters from an input voice for each analyzing time, a differential voice power defined by differentiating a voice power with respect to time being included in the group of feature parameters;

storing a time series of differential voice powers relating to the input voice;

calculating a phoneme similarity between the group of feature parameters and one of the standard patterned phonemes for each analyzing time and for each standard patterned phoneme;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of differential voice powers, the time series of similarity vectors and the time series of regression coefficient vectors;

collating the time series of input voice parameters with the time series of standard patterned voice pieces indicating a standard patterned word for each standard patterned word;

calculating an inter-frame similarity between an input voice parameter and a standard patterned voice piece at the same analyzing time for each analyzing time and for each standard patterned word, each of the inter-frame similarities being composed of a differential voice power similarity between one differential voice power and one standard differential voice power at the same analyzing time, a vector similarity between one similarity vector and one standard similarity vector at the same analyzing time and a regression similarity between one regression coefficient vector and one standard regression coefficient vector at the same analyzing time;

accumulating the inter-frame similarities according to a continuous dynamic programming matching operation to obtain a word similarity for each standard patterned word;

selecting a maximum word similarity having a maximum value from among the word similarities defined for the standard patterned words, the maximum word similarity being obtained by accumulating the inter-frame similarities for a correct standard patterned word; and outputting the correct standard patterned word as a recognized word of the input voice.

7. A method according to claim 6, further including the step of:

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values, and the posterior probability similarities are accumulated in the step of accumulating the inter-frame similarities in place of the inter-frame similarities.

8. A method according to claim 7 in which the step of subtracting a constant value from each of the inter-frame similarities includes:

defining a plurality of lattice points P(i,j) at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_p(i,j)$ for each of the standard patterned words;

defining the posterior probability similarity $l_p(i,j)$ as a logarithmic ratio $\log_e\{P(Xi,j|K)/P(Xi,j)\}$, $P(Xi,j|K)$ denoting an occurrence probability of the inter-frame similarity $Xi,j$ between an input voice parameter at a j-th frame of the input voice and a standard patterned voice piece at an i-th frame of the standard patterned word, and $P(Xi,j)$ denoting an occurrence probability of the inter-frame similarities $Xi,j$ at all of lattice points;

statistically obtaining a first relationship between the occurrence probability $P(Xi,j|K)$ and the inter-frame similarity $Xi,j$ according to pieces of voice data of a specified person;

statistically obtaining a second relationship between the occurrence probability $P(Xi,j)$ and the inter-frame similarity $Xi,j$ according to the voice data;

determining a third relationship between the posterior probability similarity $l_p(i,j)=\log_e\{P(Xi,j|K)/P(Xi,j)\}$ and the inter-frame similarity $Xi,j$ according to the first and second relationships; and approximately determining the third relationship to the posterior probability similarity $l_p(i,j)=Xi,j-\alpha$, $\alpha$ being the constant value.

9. A method according to claim 7 in which the step of accumulating the inter-frame similarities includes:

defining a plurality of lattice points P(i,j) at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing an inter-frame similarity between an input voice parameter at a j-th frame of the input voice and a standard patterned voice piece at an i-th frame of the standard patterned word by a symbol l(i,j) for each of the standard patterned words;

allocating the inter-frame similarities l(i,j) to the lattice points P(i,j) in one-to-one correspondence;

determining a dynamic programming matching path extending from a starting lattice point P(1,1) to a final lattice point P(I,J) according to a concept of an asymmetrical dynamic programming matching path in which three paths reaching a lattice point $P(i_o,j_o)$ is representatively defined;

determining an optimum dynamic programming matching path extending from the starting lattice point P(1,1) to the final lattice point P(I,J) while selecting one of the three paths defined according to the concept of the asymmetrical dynamic programming matching path on condition that an accumulated value of the inter-frame similarities l(i,j) placed on the dynamic programming matching path is maximized;

accumulating values of the inter-frame similarities l(i,j) placed on the optimum dynamic programming matching path to obtain an accumulated value; and regarding the accumulated value as the word similarity.

10. A method according to claim 9 in which the step of determining a dynamic programming matching path includes the steps of:

setting a first path extending from a lattice point $P(i_o-1, j_o-2)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path; and setting a third type path extending from a lattice path $P(i_o-2,j_o-1)$ to the lattice point $P(i_o,j_o)$ through a lattice point $P(i_o-1,j_o)$ as one of the three paths defined according to the concept of the asymmetrical dynamic programming matching path.

11. A method according to claim 9 in which the step of determining a dynamic programming matching path includes the steps of:

setting a first path extending from a lattice point $P(i_o,j_o-1)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path;

setting a third path extending from a lattice path $P(i_o-2, j_o-1)$ to the lattice point $P(i_o,j_o)$ through a lattice point $P(i_o-1,j_o)$ as one of the three paths defined according to the concept of the asymmetrical dynamic programming matching path; and setting a path weighting factor of 0.5 with which the posterior probability similarities $l_P(i_o-1,j_o)$ and $l_P(i_o,j_o)$ allocated at the lattice points $P(i_o-1,j_o)$ and $P(i_o,j_o)$ along the third path is weighted.

12. A voice recognizing method in which a word included in an input voice is recognized, comprising the steps of:

preparing a plurality of standard patterned words to be collated with the input voice, each of the standard patterned words being formed of a time series of standard patterned voice pieces;

preparing a plurality of standard patterned phonemes;

extracting a group of feature parameters from the input voice for each analyzing time;

calculating a phoneme similarity between the group of feature parameters and one of the standard patterned phonemes for each analyzing time and for each standard patterned phoneme, a value of each phoneme similarity for an analyzing time relating to a non-voice period placed between voice periods being low, and a value of each phoneme similarity for an analyzing time relating to a voice period being high;

selecting a maximum phoneme similarity from among the phoneme similarities for all of the standard patterned phonemes at the same analyzing time, the maximum phoneme similarity being obtained for each analyzing time;

producing a weighting factor according to each of the maximum phoneme similarities, a weighting factor produced from a first maximum phoneme similarity being equal to or larger than another weighting factor produced from a second maximum phoneme similarity having a value which is lower than that of the first maximum phoneme similarity, each weighting factor corresponding to one maximum phoneme similarity for an analyzing time relating to a non-voice period placed between voice periods being low, and each weighting factor corresponding to one maximum phoneme similarity for an analyzing time relating to a voice period being high;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values;

weighting each of the posterior probability similarities at an analyzing time with the weighting factor at the same analyzing time for each standard patterned word to produce a weighted posterior probability similarity for each analyzing time and for each standard patterned word, each posterior probability similarity for an analyzing time relating to a non-voice period placed between voice periods being weighted with one weighting factor having a low value, and each posterior probability similarity for an analyzing time relating to a voice period being weighted with another weighting factor having a high value;

accumulating the weighted posterior probability similarities according to a continuous dynamic programming matching operation to obtain a word similarity for each standard patterned word;

selecting a maximum word similarity having a maximum value from among the word similarities defined for the standard patterned words, the maximum word similarity being obtained by accumulating the weighted posterior probability similarities for the correct standard patterned word; and outputting the correct standard patterned word as a recognized word of the input voice.

13. A method according to claim 12 in which the step of subtracting a constant value from each of the inter-frame similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

defining the posterior probability similarity $l_P(i,j)$ as a logarithmic ratio $\log_e\{P(Xi,j|K)/P(Xi,j)\}$, $P(Xi,j|K)$ denoting an occurrence probability of the inter-frame similarity $Xi,j$ between an input voice parameter at a j-th frame of the input voice and a standard patterned voice piece at an i-th frame of the standard patterned word, and $P(Xi,j)$ denoting an occurrence probability of the inter-frame similarities $Xi,j$ at all of lattice points;

statistically obtaining a first relationship between the occurrence probability $P(Xi,j|K)$ and the inter-frame similarity $Xi,j$ according to pieces of voice data of a specified person;

statistically obtaining a second relationship between the occurrence probability $P(Xi,j)$ and the inter-frame similarity $Xi,j$ according to the voice data;

determining a third relationship between the posterior probability similarity $l_P(i,j)=\log_e\{P(Xi,j|K)/P(Xi,j)\}$ and the inter-frame similarity $Xi,j$ according to the first and second relationships; and approximately determining the third relationship to the posterior probability similarity $l_P(i,j)=Xi,j-\alpha$, $\alpha$ being the constant value.

14. A method according to claim 12 in which the step of accumulating the posterior probability similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

allocating the posterior probability similarities $l_P(i,j)$ to the lattice points $P(i,j)$ in one-to-one correspondence;

determining a dynamic programming matching path extending from a starting lattice point $P(1,1)$ to a final lattice point $P(I,J)$ according to a concept of an asymmetrical dynamic programming matching path in which three paths reaching a lattice point $P(i_o,j_o)$ is representatively defined;

determining an optimum dynamic programming matching path extending from the starting lattice point $P(1,1)$ to the final lattice point $P(I,J)$ while selecting one of the three paths defined according to the concept of the asymmetrical dynamic programming matching path on condition that an accumulated value of the posterior probability similarities $l_P(i,j)$ placed on the dynamic programming matching path is maximized;

accumulating values of the posterior probability similarities $l_P(i,j)$ placed on the optimum dynamic programming matching path to obtain an accumulated value; and regarding the accumulated value as the word similarity.

15. A method according to claim 14 in which the step of determining a dynamic programming matching path includes the steps of:

setting a first path extending from a lattice point $P(i_o-1, j_o-2)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path; and setting a third type path extending from a lattice path $P(i_o-2,j_o-1)$ to the lattice point $P(i_o,j_o)$ through a lattice point $P(i_o-1,j_o)$ as one of the three paths defined according to the concept of the asymmetrical dynamic programming matching path.

16. A method according to claim 14 in which the step of determining a dynamic programming matching path includes the steps of:

setting a first path extending from a lattice point $P(i_o,j_o-1)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path;

setting a third path extending from a lattice path $P(i_o-2, j_o-1)$ to the lattice point $P(i_o,j_o)$ through a lattice point $P(i_o-1,j_o)$ as one of the three paths defined according to the concept of the asymmetrical dynamic programming matching path; and setting a path weighting factor of 0.5 with which the posterior probability similarities $l_P(i_o-1,j_o)$ and $l_P(i_o,j_o)$ allocated at the lattice points $P(i_o-1,j_o)$ and $P(i_o,j_o)$ along the third path is weighted.

17. A voice recognizing method in which a word included in an input voice is recognized, comprising the steps of:

preparing a plurality of standard patterned words to be collated with the input voice, each of the standard patterned words being formed of a time series of standard patterned voice pieces;

preparing N standard patterned phonemes;

preparing a standard patterned noise similar to a pattern of a noise;

extracting a group of feature parameters from the input voice for each analyzing time;

calculating a phoneme similarity $d_P$(P=1 to N) between the group of feature parameters and one of the standard patterned phonemes for each analyzing time and for each standard patterned phoneme, a value of each phoneme similarity for an analyzing time relating to a noise period placed between voice periods being low, and a value of each phoneme similarity for an analyzing time relating to a voice period being high;

calculating a noise similarity $Xn$ between the group of feature parameters and the standard patterned noise for each analyzing time, a value of each noise similarity for an analyzing time relating to a noise period placed between voice periods being high, and a value of each noise similarity for an analyzing time relating to a voice period being low;

producing an N-dimensional normalized similarity vector a having N normalized phoneme similarities $a_p$ at the same analyzing time as elements for each analyzing time, each of the normalized phoneme similarities $a_p$ being determined according to an equation $a_P=d_P/(d_1^2+d_2^2+ \ldots +d_N^2+Xn^2)^{1/2}$, and the N-dimensional normalized similarity vector $a_p$ being expressed by $a=(a_1, a_2, \ldots, a_N)$;

producing a time series of normalized similarity vectors relating to the input voice;

producing a regression coefficient vector from the phoneme similarities for each analyzing time;

producing a time series of regression coefficient vectors relating to the input voice;

producing a time series of input voice parameters composed of the time series of normalized similarity vectors and the time series of regression coefficient vectors;

collating the time series of input voice parameters with the time series of standard patterned voice pieces indicating a standard patterned word for each standard patterned word to obtain an inter-frame similarity between an input voice parameter and a standard patterned voice piece at the same analyzing time for each analyzing time and for each standard patterned word, a value of each inter-frame similarity for an analyzing time relating to a noise period placed between voice periods being low, and a value of each inter-frame similarity for an analyzing time relating to a voice period being high;

subtracting a constant value from each of the inter-frame similarities respectively obtained for each analyzing time and for each standard patterned word to obtain a posterior probability similarity for each analyzing time and for each standard patterned word, each posterior probability similarity for a correct standard patterned word and an analyzing time relating to a voice period having a high positive value, each posterior probability similarity for one of standard patterned words other than the correct standard patterned word having a negative value, and each posterior probability similarity for an analyzing time relating to a noise period placed between voice periods having a negative value;

accumulating the posterior probability similarities according to a continuous dynamic programming matching operation to obtain a word similarity for each standard patterned word;

selecting a maximum word similarity having a maximum value from among the word similarities defined for the standard patterned words, the maximum word similarity being obtained by accumulating the posterior probability similarities for the correct standard patterned word; and outputting the correct standard patterned word as a recognized word of the input voice.

18. A method according to claim 17 in which the step of subtracting a constant value from each of the inter-frame similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

defining the posterior probability similarity $l_P(i,j)$ as a logarithmic ratio $\log_e\{P(Xi,j|K)/P(Xi,j)\}$, $P(Xi,j|K)$ denoting an occurrence probability of the inter-frame similarity Xi,j between an input voice parameter at a j-th frame of the input voice and a standard patterned voice piece at an i-th frame of the standard patterned word, and $P(Xi,j)$ denoting an occurrence probability of the inter-frame similarities Xi,j at all of lattice points;

statistically obtaining a first relationship between the occurrence probability $P(Xi,j|K)$ and the inter-frame similarity Xi,j according to pieces of voice data of a specified person;

statistically obtaining a second relationship between the occurrence probability $P(Xi,j)$ and the inter-frame similarity Xi,J according to the voice data;

determining a third relationship between the posterior probability similarity $l_P(i,j)=\log_e\{P(Xi,j|K)/P(Xi,j)\}$ and the inter-frame similarity Xi,j according to the first and second relationships; and approximately determining the third relationship to the posterior probability similarity $l_P(i,j)=Xi,j-\alpha$, $\alpha$ being the constant value.

19. A method according to claim 17 in which the step of accumulating the posterior probability similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

allocating the posterior probability similarities $l_P(i,j)$ to the lattice points $P(i,j)$ in one-to-one correspondence;

determining a dynamic programming matching path extending from a starting lattice point $P(1,1)$ to a final lattice point $P(I,J)$ according to a concept of an asymmetrical dynamic programming matching path in which three paths reaching a lattice point $P(i_o,j_o)$ is representatively defined;

determining an optimum dynamic programming matching path extending from the starting lattice point $P(1,1)$ to the final lattice point $P(I,J)$ while selecting one of the three paths defined according to the concept of the asymmetrical dynamic programming matching path on condition that an accumulated value of the posterior probability similarities $l_P(i,j)$ placed on the dynamic programming matching path is maximized;

accumulating values of the posterior probability similarities $l_P(i,j)$ placed on the optimum dynamic programming matching path to obtain an accumulated value; and regarding the accumulated value as the word similarity.

20. A method according to claim 19 in which the step of determining a dynamic programming matching path includes the steps of:

setting a first path extending from a lattice point $P(i_o-1, j_o-2)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path; and setting a third type path extending from a lattice path $P(i_o-2,j_o-1)$ to the lattice point $P(i_o,j_o)$ through a lattice point $P(i_o-1,j_o)$ as one of the three paths defined according to the concept of the asymmetrical dynamic programming matching path.

21. A method according to claim 19 in which the step of determining a dynamic programming matching path includes the steps of:

setting a first path extending from a lattice point $P(i_o,j_o-1)$ to a lattice point $P(i_o,j_o)$ as one of the three paths defined according to the concept of the asymmetrical dynamic programming matching path;

setting a second path extending from a lattice point $P(i_o-1,j_o)$ to the lattice point $P(i_o,j_o)$ as one of the three paths defined according to the concept of the asymmetrical dynamic programming matching path;

setting a third path extending from a lattice path $P(i_o-2, j_o-1)$ to the lattice point $P(i_o,j_o)$ through a lattice point $P(i_o-1,j_o)$ as one of the three paths defined according to the concept of the asymmetrical dynamic programming matching path; and setting a path weighting factor of 0.5 with which the posterior probability similarities $l_p(i_o-1,j_o)$ and $l_p(i_o,j_o)$ allocated at the lattice points $P(i_o-1,j_o)$ and $P(i_o,j_o)$ along the third path is weighted.

22. A voice recognizing method in which a word included in an input voice is recognized, comprising the steps of:

preparing a plurality of standard patterned phonemes;

extracting a group of standard feature parameters from pieces of voice data obtained from voices of a small number of specified persons for each analyzing time, a standard differential voice power defined by differentiating a standard voice power with respect to time being included in the group of standard feature parameters;

calculating a standard phoneme similarity between the group of standard feature parameters and one of the standard patterned phonemes for each analyzing time and for each standard patterned phoneme, a value of each phoneme similarity for an analyzing time relating to a non-voice period placed between voice periods being low, and a value of each phoneme similarity for an analyzing time relating to a voice period being high;

preparing a standard similarity vector having the standard phoneme similarities at the same analyzing time for each analyzing time;

preparing a standard regression coefficient vector from the standard phoneme similarities for each analyzing time;

producing a plurality of standard patterned words to be collated with the input voice according to the standard phoneme similarities, each of the standard patterned words being formed of a time series of standard patterned voice pieces, and each of the standard patterned voice pieces being composed of the standard phoneme similarities for the standard patterned phonemes;

extracting a group of feature parameters from an input voice for each analyzing time, a differential voice power defined by differentiating a voice power with respect to time being included in the group of feature parameters;

storing a time series of differential voice powers relating to the input voice;

calculating a phoneme similarity between the group of feature parameters and one of the standard patterned phonemes for each analyzing time and for each standard patterned phoneme;

selecting a maximum phoneme similarity from among the phoneme similarities for all of the standard patterned phonemes at the same analyzing time, the maximum phoneme similarity being obtained for each analyzing time;

producing a weighting factor according to each of the maximum phoneme similarities, a weighting factor produced from a first maximum phoneme similarity being equal to or larger than another weighting factor produced from a second maximum phoneme similarity having a value which is lower than that of the first maximum phoneme similarity, each weighting factor corresponding to one maximum phoneme similarity for an analyzing time relating to a non-voice period placed between voice periods being low, and each weighting factor corresponding to one maximum phoneme similarity for an analyzing time relating to a voice period being high;

producing a similarity vector having the phoneme similarities at the same analyzing time as elements for each analyzing time, a time series of similarity vectors relating to the input voice being formed;

producing a regression coefficient vector from the phoneme similarities for each analyzing time, a time series of regression coefficient vectors relating to the input voice being formed;

producing a time series of input voice parameters composed of the time series of differential voice powers, the time series of similarity vectors and the time series of regression coefficient vectors;

collating the time series of input voice parameters with the time series of standard patterned voice pieces indicating a standard patterned word for each standard patterned word;

calculating an inter-frame similarity between an input voice parameter and a standard patterned voice piece at the same analyzing time for each analyzing time and for each standard patterned word, each of the inter-frame similarities being composed of a differential voice power similarity between one differential voice power and one standard differential voice power at the same analyzing time, a vector similarity between one similarity vector and one standard similarity vector at the same analyzing time and a regression similarity between one regression coefficient vector and one standard regression coefficient vector at the same analyzing time;

subtracting a constant value from each of the inter-frame similarities respectively obtained for each analyzing time and for each standard patterned word to obtain a posterior probability similarity for each analyzing time and for each standard patterned word, the posterior probability similarities for a correct standard patterned word having positive values, and the posterior probability similarities for standard patterned words other than the correct standard patterned word having negative values, and weighting each of the posterior probability similarities at an analyzing time with the weighting factor at the same analyzing time for each standard patterned word to produce a weighted posterior probability similarity for each analyzing time and for each standard patterned word, each posterior probability similarity for an analyzing time relating to a non-voice period placed between voice periods being weighted with one weighting factor having a low value, and each posterior probability similarity for an analyzing time relating to a voice period being weighted with another weighting factor having a high value;

accumulating the weighted posterior probability similarities according to a continuous dynamic programming matching operation to obtain a word similarity for each standard patterned word;

selecting a maximum word similarity having a maximum value from among the word similarities defined for the standard patterned words, the maximum word similarity being obtained by accumulating the weighted posterior probability similarities for the correct standard patterned word; and outputting the correct standard patterned word as a recognized word of the input voice.

23. A method according to claim 22 in which the step of subtracting a constant value from each of the inter-frame similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

defining the posterior probability similarity $l_P(i,j)$ as a logarithmic ratio $\log_e\{P(Xi,j|K)/P(Xi,j)\}$, $P(Xi,j|K)$ denoting an occurrence probability of the inter-frame similarity $Xi,j$ between an input voice parameter at a j-th frame of the input voice and a standard patterned voice piece at an i-th frame of the standard patterned word, and $P(Xi,j)$ denoting an occurrence probability of the inter-frame similarities $Xi,j$ at all of lattice points;

statistically obtaining a first relationship between the occurrence probability $P(Xi,j|K)$ and the inter-frame similarity $Xi,j$ according to pieces of voice data of a specified person:

statistically obtaining a second relationship between the occurrence probability $P(XI,j)$ and the inter-frame similarity $Xi,j$ according to the voice data:

determining a third relationship between the posterior probability similarity $l_P(i,j)=\log_e\{P(Xi,j|K)/P(Xi,j)\}$ and the inter-frame similarity $Xi,j$ according to the first and second relationships: and approximately determining the third relationship to the posterior probability similarity $l_P(i,j)=Xi,j-\alpha$, $\alpha$ being the constant value.

24. A method according to claim 22 in which the step of accumulating the posterior probability similarities includes:

defining a plurality of lattice points $P(i,j)$ at intersections of i-th frames (i=1 to I) of a standard patterned word and j-th frames (j=1 to J) of the input voice for each of standard patterned words, each of the frames of a standard patterned word being obtained by dividing the standard patterned word for each analyzing time, and each of the frames of the input voice being obtained by dividing the input voice for each analyzing time;

expressing a posterior probability similarity between an input voice parameter at a j-th frame of the input voice and a standard patterned voice piece at an i-th frame of the standard patterned word by a symbol $l_P(i,j)$ for each of the standard patterned words;

allocating the posterior probability similarities $l_P(i,j)$ to the lattice points $P(i,j)$ in one-to-one correspondence;

determining a dynamic programming matching path extending from a starting lattice point $P(1,1)$ to a final lattice point $P(I,J)$ according to a concept of an asymmetrical dynamic programming matching path in which three paths reaching a lattice point $P(i_o,j_o)$ is representatively defined;

determining an optimum dynamic programming matching path extending from the starting lattice point $P(1,1)$ to the final lattice point $P(I,J)$ while selecting one of the three paths defined according to the concept of the asymmetrical dynamic programming matching path on condition that an accumulated value of the posterior probability similarities $l_P(i,j)$ placed on the dynamic programming matching path is maximized;

accumulating values of the posterior probability similarities $l_P(i,j)$ placed on the optimum dynamic programming matching path to obtain an accumulated value; and regarding the accumulated value as the word similarity.

25. A method according to claim 24 in which the step of determining a dynamic programming matching path includes the steps of:

setting a first path extending from a lattice point $P(i_o-1, j_o-2)$ to a lattice point $P(i_o,j_o)$ as one of the three paths defined according to the concept of the asymmetrical dynamic programming matching path;

setting a second path extending from a lattice point $P(i_o-1,j_o-1)$ to the lattice point $P(i_o,j_o)$ as one of the three paths defined according to the concept of the asymmetrical dynamic programming matching path; and setting a third type path extending from a lattice path $P(i_o-2,j_o-1)$ to the lattice point $P(i_o,j_o)$ through a lattice point $P(i_o-1,j_o)$ as one of the three paths defined according to the concept of the asymmetrical dynamic programming matching path.

26. A method according to claim 24 in which the step of determining a dynamic programming matching path includes the steps of:

setting a first path extending from a lattice point $p(i_o,j_o-1)$ to a lattice point $P(i_o,j_o)$ as one of the three paths defined according to the concept of the asymmetrical dynamic programming matching path;

setting a second path extending from a lattice point $p(i_o-1,j_o)$ to the lattice point $P(i_o,j_o)$ as one of the three paths defined according to the concept of the asymmetrical dynamic programming matching path;

setting a third path extending from a lattice path $P(i_o-2,j_o)$ to the lattice point $P(i_o,j_o)$ through a lattice point $P(i_o-1,j_o)$ as one of the three paths defined according to the concept of the asymmetrical dynamic programming matching path; and setting a path weighting factor of 0.5 with which the posterior probability similarities $l_P(i_o-1,j_o)$ and $l_P(i_o,j_o)$ allocated at the lattice points $P(i_o-1,j_o)$ and $P(i_o,j_o)$ along the third path is weighted.

27. A voice recognizing method according to claim 16 in which each inter-frame similarity calculated in the step of calculating an inter-frame similarity is a weighted sum of a differential voice power similarity between one differential voice power and one standard differential voice power at the same analyzing time, a vector similarity between one similarity vector and one standard similarity vector at the same analyzing time and a regression similarity between one regression coefficient vector and one standard regression coefficient vector at the same analyzing time.

28. A voice recognizing method according to claim 16 in which the step of accumulating the inter-frame similarities includes the steps of determining a starting point of each word in the input voice according to the differential voice power similarities on condition that a differential voice power at the starting point is rapidly increased;

determining an ending point of each word in the input voice according to the differential voice power similarities on condition that a differential voice power at the ending point is rapidly decreased; and accumulating each group of inter-frame similarities at a group of analyzing periods ranging from the starting point to the ending point to obtain one word similarity.

* * * * *